US009325429B2

(12) United States Patent
Berlin et al.

(10) Patent No.: US 9,325,429 B2
(45) Date of Patent: Apr. 26, 2016

(54) PROVIDING DIGITAL DATA SERVICES AS ELECTRICAL SIGNALS AND RADIO-FREQUENCY (RF) COMMUNICATIONS OVER OPTICAL FIBER IN DISTRIBUTED COMMUNICATIONS SYSTEMS, AND RELATED COMPONENTS AND METHODS

(71) Applicant: Corning Optical Communications LLC, Hickory, NC (US)

(72) Inventors: Igor Berlin, Potomac, MD (US); William Patrick Cune, Charlotte, NC (US); Jason Elliott Greene, Hickory, NC (US); Christian Heidler, Hohenschaeftlarn (DE); James Arthur Register, III, Hickory, NC (US); Wolfgang Gottfried Tobias Schweiker, Weyarn (DE)

(73) Assignee: Corning Optical Communications LLC, Hickory, NC (US)

( * ) Notice: Subject to any disclaimer, the term of this patent is extended or adjusted under 35 U.S.C. 154(b) by 1 day.

(21) Appl. No.: 13/967,426

(22) Filed: Aug. 15, 2013

(65) Prior Publication Data
US 2013/0330086 A1 Dec. 12, 2013

Related U.S. Application Data

(63) Continuation of application No. PCT/US2012/025337, filed on Feb. 16, 2012.

(60) Provisional application No. 61/444,922, filed on Feb. 21, 2011.

(51) Int. Cl.
*H04B 10/80* (2013.01)
*H04B 10/2575* (2013.01)
(Continued)

(52) U.S. Cl.
CPC ............... *H04B 10/808* (2013.01); *H04B 3/44* (2013.01); *H04B 10/25753* (2013.01); *H04L 12/10* (2013.01); *H04L 12/413* (2013.01); *H04W 88/085* (2013.01)

(58) Field of Classification Search
CPC ........ H04B 10/808; H04B 10/2575–10/25759; H04B 3/44
USPC ........................................ 398/115, 116, 171
See application file for complete search history.

(56) References Cited

U.S. PATENT DOCUMENTS

| 4,365,865 A | 12/1982 | Stiles |
| 4,867,527 A | 9/1989 | Dotti et al. |

(Continued)

FOREIGN PATENT DOCUMENTS

| AU | 645192 B2 | 1/1994 |
| AU | 731180 B2 | 3/2001 |

(Continued)

OTHER PUBLICATIONS

Patent Cooperation Treaty, International Search Report, May 16, 2012, 4 pages.

(Continued)

*Primary Examiner* — David Payne
*Assistant Examiner* — Casey Kretzer
(74) *Attorney, Agent, or Firm* — C. Keith Montgomery

(57) ABSTRACT

Distributed antenna systems providing and supporting radio frequency (RF) communication services and digital data services, and related components and methods are disclosed. The RF communication services can be distributed over optical fiber to client devices, such as remote antenna units for example. Power can also be distributed over electrical medium that is provided to distribute digital data services, if desired, to provide power to remote communications devices and/or client devices coupled to the remote communications devices for operation. In this manner, as an example, the same electrical medium used to transport digital data signals in the distributed antenna system can also be employed to provide power to the remote communications devices and/or client devices coupled to the remote communications devices. Power may be injected and switched from two or more power sources over selected electrical medium to distribute power for power-consuming components supporting RF communications services and digital data services.

26 Claims, 13 Drawing Sheets

(51) Int. Cl.
*H04B 3/44* (2006.01)
*H04L 12/10* (2006.01)
*H04W 88/00* (2009.01)
*H04L 12/413* (2006.01)
*H04W 88/08* (2009.01)

(56) References Cited

U.S. PATENT DOCUMENTS

| | | |
|---|---|---|
| 4,889,977 A | 12/1989 | Haydon |
| 4,896,939 A | 1/1990 | O'Brien |
| 4,916,460 A | 4/1990 | Powell |
| 4,972,505 A | 11/1990 | Isberg |
| 5,039,195 A | 8/1991 | Jenkins et al. |
| 5,042,086 A | 8/1991 | Cole et al. |
| 5,125,060 A | 6/1992 | Edmundson |
| 5,189,718 A | 2/1993 | Barrett et al. |
| 5,189,719 A | 2/1993 | Coleman et al. |
| 5,206,655 A | 4/1993 | Caille et al. |
| 5,210,812 A | 5/1993 | Nilsson et al. |
| 5,260,957 A | 11/1993 | Hakimi et al. |
| 5,263,108 A | 11/1993 | Kurokawa et al. |
| 5,267,122 A | 11/1993 | Glover et al. |
| 5,268,971 A | 12/1993 | Nilsson et al. |
| 5,280,472 A | 1/1994 | Gilhousen et al. |
| 5,295,154 A | 3/1994 | Meier et al. |
| 5,299,947 A | 4/1994 | Barnard |
| 5,301,056 A | 4/1994 | O'Neill |
| 5,339,058 A | 8/1994 | Lique |
| 5,339,184 A | 8/1994 | Tang |
| 5,377,035 A | 12/1994 | Wang et al. |
| 5,379,455 A | 1/1995 | Koschek |
| 5,400,391 A | 3/1995 | Emura et al. |
| 5,404,570 A | 4/1995 | Charas et al. |
| 5,424,864 A | 6/1995 | Emura |
| 5,428,636 A | 6/1995 | Meier |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,499,241 A | 3/1996 | Thompson et al. |
| 5,504,746 A | 4/1996 | Meier |
| 5,519,691 A | 5/1996 | Darcie et al. |
| 5,543,000 A | 8/1996 | Lique |
| 5,544,161 A | 8/1996 | Bigham et al. |
| 5,546,443 A | 8/1996 | Raith |
| 5,553,064 A | 9/1996 | Paff et al. |
| 5,557,698 A | 9/1996 | Gareis et al. |
| 5,574,815 A | 11/1996 | Kneeland |
| 5,598,288 A | 1/1997 | Collar |
| 5,603,080 A | 2/1997 | Kallander et al. |
| 5,615,034 A | 3/1997 | Hori |
| 5,621,786 A | 4/1997 | Fischer et al. |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,684,799 A | 11/1997 | Bigham et al. |
| 5,689,355 A | 11/1997 | Okubo et al. |
| 5,703,602 A | 12/1997 | Casebolt |
| 5,726,984 A | 3/1998 | Kubler et al. |
| 5,774,789 A | 6/1998 | van der Kaay et al. |
| 5,790,536 A | 8/1998 | Mahany et al. |
| 5,790,606 A | 8/1998 | Dent |
| 5,802,173 A | 9/1998 | Hamilton-Piercy et al. |
| 5,802,473 A | 9/1998 | Rutledge et al. |
| 5,805,983 A | 9/1998 | Naidu et al. |
| 5,809,422 A | 9/1998 | Raleigh et al. |
| 5,812,296 A | 9/1998 | Tarusawa et al. |
| 5,818,619 A | 10/1998 | Medved et al. |
| 5,821,510 A | 10/1998 | Cohen et al. |
| 5,825,651 A | 10/1998 | Gupta et al. |
| 5,825,829 A | 10/1998 | Borazjani et al. |
| 5,832,364 A | 11/1998 | Gustafson |
| 5,838,474 A | 11/1998 | Stilling |
| 5,852,651 A | 12/1998 | Fischer et al. |
| 5,854,986 A | 12/1998 | Dorren et al. |
| 5,867,485 A | 2/1999 | Chambers et al. |
| 5,880,863 A | 3/1999 | Rideout et al. |
| 5,881,200 A | 3/1999 | Burt |
| 5,883,882 A | 3/1999 | Schwartz |
| 5,890,055 A | 3/1999 | Chu et al. |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,959,531 A | 9/1999 | Gallagher, III et al. |
| 5,960,344 A | 9/1999 | Mahany |
| 5,969,837 A | 10/1999 | Farber et al. |
| 5,982,413 A | 11/1999 | Irie et al. |
| 5,983,070 A | 11/1999 | Georges et al. |
| 5,987,303 A | 11/1999 | Dutta et al. |
| 6,005,884 A | 12/1999 | Cook et al. |
| 6,006,105 A | 12/1999 | Rostoker et al. |
| 6,014,546 A | 1/2000 | Georges et al. |
| 6,016,426 A | 1/2000 | Bodell |
| 6,023,625 A | 2/2000 | Myers, Jr. |
| 6,046,992 A | 4/2000 | Meier et al. |
| 6,078,622 A | 6/2000 | Boytim et al. |
| 6,088,381 A | 7/2000 | Myers, Jr. |
| 6,112,086 A | 8/2000 | Wala |
| 6,124,957 A | 9/2000 | Goel et al. |
| 6,127,917 A | 10/2000 | Tuttle |
| 6,128,470 A | 10/2000 | Naidu et al. |
| 6,148,041 A | 11/2000 | Dent |
| 6,150,921 A | 11/2000 | Werb et al. |
| 6,157,810 A | 12/2000 | Georges et al. |
| 6,219,553 B1 | 4/2001 | Panasik |
| 6,222,503 B1 | 4/2001 | Gietema et al. |
| 6,223,021 B1 | 4/2001 | Silvia et al. |
| 6,232,870 B1 | 5/2001 | Garber et al. |
| 6,236,789 B1 | 5/2001 | Fitz |
| 6,240,274 B1 | 5/2001 | Izadpanah |
| 6,268,946 B1 | 7/2001 | Larkin et al. |
| 6,292,673 B1 | 9/2001 | Maeda et al. |
| 6,301,240 B1 | 10/2001 | Slabinski et al. |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,244 B1 | 12/2001 | Swartz et al. |
| 6,334,219 B1 | 12/2001 | Hill et al. |
| 6,337,754 B1 | 1/2002 | Imajo |
| 6,353,406 B1 | 3/2002 | Lanzl et al. |
| 6,353,600 B1 | 3/2002 | Schwartz et al. |
| 6,356,374 B1 | 3/2002 | Farhan |
| 6,359,714 B1 | 3/2002 | Imajo |
| 6,373,611 B1 | 4/2002 | Farhan et al. |
| 6,374,078 B1 | 4/2002 | Williams et al. |
| 6,374,124 B1 | 4/2002 | Slabinski |
| 6,374,311 B1 | 4/2002 | Mahany et al. |
| 6,389,010 B1 | 5/2002 | Kubler et al. |
| 6,392,770 B1 | 5/2002 | Sasai et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,438,301 B1 | 8/2002 | Johnson et al. |
| 6,438,371 B1 | 8/2002 | Fujise et al. |
| 6,452,915 B1 | 9/2002 | Jorgensen |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |

(56) References Cited

U.S. PATENT DOCUMENTS

| | | | |
|---|---|---|---|
| 6,501,768 B2 | 12/2002 | Marin et al. |
| 6,501,942 B1 | 12/2002 | Weissman et al. |
| 6,501,965 B1 | 12/2002 | Lucidarme |
| 6,504,636 B1 | 1/2003 | Seto et al. |
| 6,512,478 B1 | 1/2003 | Chien |
| 6,519,395 B1 | 2/2003 | Bevan et al. |
| 6,523,177 B1 | 2/2003 | Brown |
| 6,525,855 B1 | 2/2003 | Westbrook et al. |
| 6,526,264 B2 | 2/2003 | Sugar et al. |
| 6,549,772 B1 | 4/2003 | Chavez et al. |
| 6,556,551 B1 | 4/2003 | Schwartz |
| 6,560,441 B1 | 5/2003 | Sabat, Jr. et al. |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,594,496 B2 | 7/2003 | Schwartz |
| 6,597,325 B2 | 7/2003 | Judd et al. |
| 6,606,430 B2 | 8/2003 | Bartur et al. |
| 6,615,074 B2 | 9/2003 | Mickle et al. |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,670,930 B2 | 12/2003 | Navarro |
| 6,675,294 B1 | 1/2004 | Gupta et al. |
| 6,687,437 B1 | 2/2004 | Starnes et al. |
| 6,690,328 B2 | 2/2004 | Judd |
| 6,697,603 B1 | 2/2004 | Lovinggood et al. |
| 6,704,298 B1 | 3/2004 | Matsumiya et al. |
| 6,704,545 B1 | 3/2004 | Wala |
| 6,704,579 B2 | 3/2004 | Woodhead et al. |
| 6,710,366 B1 | 3/2004 | Lee et al. |
| 6,731,880 B2 | 5/2004 | Westbrook et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,826,164 B2 | 11/2004 | Mani et al. |
| 6,826,165 B1 | 11/2004 | Meier et al. |
| 6,826,337 B2 | 11/2004 | Linnell |
| 6,831,901 B2 | 12/2004 | Millar |
| 6,842,433 B2 | 1/2005 | West et al. |
| 6,842,459 B1 | 1/2005 | Binder |
| 6,847,856 B1 | 1/2005 | Bohannon |
| 6,850,510 B2 | 2/2005 | Kubler et al. |
| 6,865,390 B2 | 3/2005 | Goss et al. |
| 6,873,823 B2 | 3/2005 | Hasarchi et al. |
| 6,876,056 B2 | 4/2005 | Tilmans et al. |
| 6,876,852 B1 | 4/2005 | Li et al. |
| 6,879,290 B1 | 4/2005 | Toutain et al. |
| 6,882,833 B2 | 4/2005 | Nguyen |
| 6,883,710 B2 | 4/2005 | Chung |
| 6,885,846 B1 | 4/2005 | Panasik et al. |
| 6,889,060 B2 | 5/2005 | Fernando et al. |
| 6,895,253 B1 | 5/2005 | Carloni et al. |
| 6,909,399 B1 | 6/2005 | Zegelin et al. |
| 6,915,058 B2 | 7/2005 | Pons |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,933,849 B2 | 8/2005 | Sawyer |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,016,308 B1 | 3/2006 | Gallagher |
| 7,020,451 B2 | 3/2006 | Sugar et al. |
| 7,020,473 B2 | 3/2006 | Splett |
| 7,024,166 B2 | 4/2006 | Wallace et al. |
| 7,035,512 B2 | 4/2006 | Van Bijsterveld |
| 7,035,671 B2 | 4/2006 | Solum |
| 7,039,399 B2 | 5/2006 | Fischer |
| 7,047,028 B2 | 5/2006 | Cagenius |
| 7,050,017 B2 | 5/2006 | King et al. |
| 7,053,838 B2 | 5/2006 | Judd |
| 7,054,513 B2 | 5/2006 | Herz et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,092,710 B1 | 8/2006 | Stoter et al. |
| 7,093,985 B2 | 8/2006 | Lord et al. |
| 7,103,312 B2 | 9/2006 | Judd et al. |
| 7,103,377 B2 | 9/2006 | Bauman et al. |
| 7,106,931 B2 | 9/2006 | Sutehall et al. |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,133,697 B2 | 11/2006 | Judd et al. |
| 7,142,503 B1 | 11/2006 | Grant et al. |
| 7,142,535 B2 | 11/2006 | Kubler et al. |
| 7,160,032 B2 | 1/2007 | Nagashima et al. |
| 7,181,206 B2 | 2/2007 | Pedersen |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,245,603 B1 | 7/2007 | Lucidarme et al. |
| 7,257,328 B2 | 8/2007 | Levinson et al. |
| 7,263,293 B2 | 8/2007 | Ommodt et al. |
| 7,269,311 B2 | 9/2007 | Kim et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,442,679 B2 | 10/2008 | Stolte et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,457,646 B2 | 11/2008 | Mahany et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |

(56) References Cited

U.S. PATENT DOCUMENTS

| | | |
|---|---|---|
| 7,469,105 B2 | 12/2008 | Wake et al. |
| 7,477,597 B2 | 1/2009 | Segel |
| 7,483,504 B2 | 1/2009 | Shapira et al. |
| 7,496,070 B2 | 2/2009 | Vesuna |
| 7,496,384 B2 | 2/2009 | Seto et al. |
| 7,522,552 B2 | 4/2009 | Fein et al. |
| 7,542,452 B2 | 6/2009 | Penumetsa |
| 7,548,695 B2 | 6/2009 | Wake |
| 7,551,641 B2 | 6/2009 | Pirzada et al. |
| 7,552,246 B2 | 6/2009 | Mahany et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,599,420 B2 | 10/2009 | Forenza et al. |
| 7,606,594 B2 | 10/2009 | Jesse et al. |
| 7,627,250 B2 | 12/2009 | George et al. |
| 7,630,690 B2 | 12/2009 | Kaewell, Jr. et al. |
| 7,633,934 B2 | 12/2009 | Kubler et al. |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,153 B2 | 2/2010 | Zavadsky |
| 7,668,565 B2 | 2/2010 | Ylänen et al. |
| 7,684,709 B2 | 3/2010 | Ray et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,715,375 B2 | 5/2010 | Kubler et al. |
| 7,715,466 B1 | 5/2010 | Oh et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,764,978 B1 | 7/2010 | West |
| 7,768,951 B2 | 8/2010 | Kubler et al. |
| 7,773,573 B2 | 8/2010 | Chung et al. |
| 7,778,603 B2 | 8/2010 | Palin et al. |
| 7,783,263 B2 | 8/2010 | Sperlich et al. |
| 7,787,854 B2 | 8/2010 | Conyers et al. |
| 7,805,073 B2 | 9/2010 | Sabat, Jr. et al. |
| 7,809,012 B2 | 10/2010 | Ruuska et al. |
| 7,817,958 B2 | 10/2010 | Scheinert et al. |
| 7,817,969 B2 | 10/2010 | Castaneda et al. |
| 7,835,328 B2 | 11/2010 | Stephens et al. |
| 7,844,273 B2 | 11/2010 | Scheinert |
| 7,848,316 B2 | 12/2010 | Kubler et al. |
| 7,848,731 B1 | 12/2010 | Dianda et al. |
| 7,853,234 B2 | 12/2010 | Afsahi |
| 7,870,321 B2 | 1/2011 | Rofougaran |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,916,706 B2 | 3/2011 | Kubler et al. |
| 7,917,145 B2 | 3/2011 | Mahany et al. |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,929,940 B1 | 4/2011 | Dianda et al. |
| 7,936,713 B2 | 5/2011 | Kubler et al. |
| 7,948,897 B2 | 5/2011 | Stuart et al. |
| 7,949,364 B2 | 5/2011 | Kasslin et al. |
| 7,957,777 B1 | 6/2011 | Vu et al. |
| 7,962,042 B2 | 6/2011 | Deas |
| 7,962,176 B2 | 6/2011 | Li et al. |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,005,152 B2 | 8/2011 | Wegener |
| 8,010,116 B2 | 8/2011 | Scheinert |
| 8,018,907 B2 | 9/2011 | Kubler et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,107,464 B2 | 1/2012 | Schmidt et al. |
| 8,135,102 B2 | 3/2012 | Wiwel et al. |
| 8,155,525 B2 | 4/2012 | Cox |
| 8,174,428 B2 | 5/2012 | Wegener |
| 8,213,401 B2 | 7/2012 | Fischer et al. |
| 8,270,387 B2 | 9/2012 | Cannon et al. |
| 8,274,929 B2 | 9/2012 | Schmidt et al. |
| 8,279,800 B2 | 10/2012 | Schmidt et al. |
| 8,290,483 B2 | 10/2012 | Sabat, Jr. et al. |
| 8,306,563 B2 | 11/2012 | Zavadsky et al. |
| 8,346,091 B2 | 1/2013 | Kummetz et al. |
| 8,346,278 B2 | 1/2013 | Wala et al. |
| 8,422,884 B2 | 4/2013 | Mao |
| 8,428,510 B2 | 4/2013 | Stratford et al. |
| 8,457,562 B2 | 6/2013 | Zavadsky et al. |
| 8,462,683 B2 | 6/2013 | Uyehara et al. |
| 8,467,823 B2 | 6/2013 | Seki et al. |
| 8,472,579 B2 | 6/2013 | Uyehara et al. |
| 8,509,215 B2 | 8/2013 | Stuart |
| 8,509,850 B2 | 8/2013 | Zavadsky et al. |
| 8,526,970 B2 | 9/2013 | Wala et al. |
| 8,532,242 B2 | 9/2013 | Fischer et al. |
| 8,548,526 B2 | 10/2013 | Schmidt et al. |
| 8,583,100 B2 | 11/2013 | Koziy et al. |
| 8,626,245 B2 | 1/2014 | Zavadsky et al. |
| 8,634,766 B2 | 1/2014 | Hobbs et al. |
| 8,681,917 B2 | 3/2014 | McAllister et al. |
| 8,682,338 B2 | 3/2014 | Lemson et al. |
| 8,693,342 B2 | 4/2014 | Uyehara et al. |
| 8,694,034 B2 | 4/2014 | Notargiacomo |
| 8,699,982 B2 | 4/2014 | Singh |
| 8,737,300 B2 | 5/2014 | Stapleton et al. |
| 8,737,454 B2 | 5/2014 | Wala et al. |
| 8,743,718 B2 | 6/2014 | Grenier et al. |
| 8,743,756 B2 | 6/2014 | Uyehara et al. |
| 8,792,933 B2 | 7/2014 | Chen |
| 8,837,659 B2 | 9/2014 | Uyehara et al. |
| 8,837,940 B2 | 9/2014 | Smith et al. |
| 8,908,607 B2 | 12/2014 | Kummetz et al. |
| 8,929,288 B2 | 1/2015 | Stewart et al. |
| 8,948,816 B2 | 2/2015 | Fischer et al. |
| 8,958,789 B2 | 2/2015 | Bauman et al. |
| 8,976,067 B2 | 3/2015 | Fischer |
| 9,001,811 B2 | 4/2015 | Wala et al. |
| 9,042,732 B2 | 5/2015 | Cune et al. |
| 2001/0036163 A1 | 11/2001 | Sabat, Jr. et al. |
| 2001/0053011 A1 | 12/2001 | Imajo |
| 2002/0003645 A1 | 1/2002 | Kim et al. |
| 2002/0012336 A1 | 1/2002 | Hughes et al. |
| 2002/0012495 A1 | 1/2002 | Sasai et al. |
| 2002/0031113 A1 | 3/2002 | Dodds et al. |
| 2002/0048071 A1 | 4/2002 | Suzuki et al. |
| 2002/0055371 A1 | 5/2002 | Arnon et al. |
| 2002/0075906 A1 | 6/2002 | Cole et al. |
| 2002/0090915 A1 | 7/2002 | Komara et al. |
| 2002/0092347 A1 | 7/2002 | Niekerk et al. |
| 2002/0111149 A1 | 8/2002 | Shoki |
| 2002/0111192 A1 | 8/2002 | Thomas et al. |
| 2002/0114038 A1 | 8/2002 | Arnon et al. |
| 2002/0123365 A1 | 9/2002 | Thorson et al. |
| 2002/0126967 A1 | 9/2002 | Panak et al. |
| 2002/0130778 A1 | 9/2002 | Nicholson |
| 2002/0181668 A1 | 12/2002 | Masoian et al. |
| 2002/0190845 A1 | 12/2002 | Moore |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0078052 A1 | 4/2003 | Atias et al. |
| 2003/0078074 A1 | 4/2003 | Sesay et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |

(56) References Cited

U.S. PATENT DOCUMENTS

| | | | |
|---|---|---|---|
| 2004/0037300 A1* | 2/2004 | Lehr et al. | 370/401 |
| 2004/0041714 A1 | 3/2004 | Forster | |
| 2004/0043764 A1 | 3/2004 | Bigham et al. | |
| 2004/0047313 A1 | 3/2004 | Rumpf et al. | |
| 2004/0078151 A1 | 4/2004 | Aljadeff et al. | |
| 2004/0100930 A1 | 5/2004 | Shapira et al. | |
| 2004/0105435 A1 | 6/2004 | Morioka | |
| 2004/0106435 A1 | 6/2004 | Bauman et al. | |
| 2004/0110469 A1 | 6/2004 | Judd et al. | |
| 2004/0126068 A1 | 7/2004 | Van Bijsterveld | |
| 2004/0146020 A1 | 7/2004 | Kubler et al. | |
| 2004/0149736 A1 | 8/2004 | Clothier | |
| 2004/0151164 A1 | 8/2004 | Kubler et al. | |
| 2004/0151503 A1 | 8/2004 | Kashima et al. | |
| 2004/0157623 A1 | 8/2004 | Splett | |
| 2004/0160912 A1 | 8/2004 | Kubler et al. | |
| 2004/0160913 A1 | 8/2004 | Kubler et al. | |
| 2004/0162115 A1 | 8/2004 | Smith et al. | |
| 2004/0162116 A1 | 8/2004 | Han et al. | |
| 2004/0165573 A1 | 8/2004 | Kubler et al. | |
| 2004/0175173 A1 | 9/2004 | Deas | |
| 2004/0198451 A1 | 10/2004 | Varghese | |
| 2004/0202257 A1 | 10/2004 | Mehta et al. | |
| 2004/0203704 A1 | 10/2004 | Ommodt et al. | |
| 2004/0203846 A1 | 10/2004 | Caronni et al. | |
| 2004/0204109 A1 | 10/2004 | Hoppenstein | |
| 2004/0208526 A1 | 10/2004 | Mibu | |
| 2004/0218873 A1 | 11/2004 | Nagashima et al. | |
| 2004/0230846 A1 | 11/2004 | Mancey et al. | |
| 2004/0233877 A1 | 11/2004 | Lee et al. | |
| 2004/0258105 A1 | 12/2004 | Spathas et al. | |
| 2005/0052287 A1 | 3/2005 | Whitesmith et al. | |
| 2005/0058451 A1 | 3/2005 | Ross | |
| 2005/0068179 A1 | 3/2005 | Roesner | |
| 2005/0076982 A1 | 4/2005 | Metcalf et al. | |
| 2005/0078006 A1 | 4/2005 | Hutchins et al. | |
| 2005/0093679 A1 | 5/2005 | Zai et al. | |
| 2005/0099343 A1 | 5/2005 | Asrani et al. | |
| 2005/0116821 A1 | 6/2005 | Wilsey et al. | |
| 2005/0141545 A1 | 6/2005 | Fein et al. | |
| 2005/0143077 A1 | 6/2005 | Charbonneau | |
| 2005/0147071 A1 | 7/2005 | Karaoguz et al. | |
| 2005/0148306 A1 | 7/2005 | Hiddink | |
| 2005/0159108 A1 | 7/2005 | Fletcher et al. | |
| 2005/0174236 A1 | 8/2005 | Brookner | |
| 2005/0201761 A1 | 9/2005 | Bartur et al. | |
| 2005/0219050 A1 | 10/2005 | Martin | |
| 2005/0224585 A1 | 10/2005 | Durrant et al. | |
| 2005/0226625 A1 | 10/2005 | Wake et al. | |
| 2005/0232636 A1 | 10/2005 | Durrant et al. | |
| 2005/0242188 A1 | 11/2005 | Vesuna | |
| 2005/0252971 A1 | 11/2005 | Howarth et al. | |
| 2005/0266797 A1 | 12/2005 | Utsumi et al. | |
| 2005/0266854 A1 | 12/2005 | Niiho et al. | |
| 2005/0269930 A1 | 12/2005 | Shimizu et al. | |
| 2005/0271396 A1 | 12/2005 | Iannelli | |
| 2006/0002326 A1 | 1/2006 | Vesuna | |
| 2006/0014548 A1 | 1/2006 | Bolin et al. | |
| 2006/0017633 A1 | 1/2006 | Pronkine | |
| 2006/0045054 A1 | 3/2006 | Utsumi et al. | |
| 2006/0053324 A1 | 3/2006 | Giat et al. | |
| 2006/0062579 A1 | 3/2006 | Kim et al. | |
| 2006/0079290 A1 | 4/2006 | Seto et al. | |
| 2006/0094470 A1 | 5/2006 | Wake et al. | |
| 2006/0104643 A1 | 5/2006 | Lee et al. | |
| 2006/0159388 A1 | 7/2006 | Kawase et al. | |
| 2006/0182446 A1 | 8/2006 | Kim et al. | |
| 2006/0182449 A1 | 8/2006 | Iannelli et al. | |
| 2006/0189354 A1 | 8/2006 | Lee et al. | |
| 2006/0233506 A1 | 10/2006 | Noonan et al. | |
| 2006/0239630 A1 | 10/2006 | Hase et al. | |
| 2006/0274704 A1 | 12/2006 | Desai et al. | |
| 2007/0008939 A1 | 1/2007 | Fischer | |
| 2007/0009266 A1 | 1/2007 | Bothwell et al. | |
| 2007/0058978 A1 | 3/2007 | Lee et al. | |
| 2007/0060045 A1 | 3/2007 | Prautzsch | |
| 2007/0060055 A1 | 3/2007 | Desai et al. | |
| 2007/0071128 A1 | 3/2007 | Meir et al. | |
| 2007/0076649 A1 | 4/2007 | Lin et al. | |
| 2007/0093273 A1 | 4/2007 | Cai | |
| 2007/0149250 A1 | 6/2007 | Crozzoli et al. | |
| 2007/0166042 A1 | 7/2007 | Seeds et al. | |
| 2007/0208961 A1* | 9/2007 | Ghoshal et al. | 713/300 |
| 2007/0224954 A1 | 9/2007 | Gopi | |
| 2007/0248358 A1 | 10/2007 | Sauer | |
| 2007/0253714 A1 | 11/2007 | Seeds et al. | |
| 2007/0257796 A1 | 11/2007 | Easton et al. | |
| 2007/0264009 A1 | 11/2007 | Sabat, Jr. et al. | |
| 2007/0274279 A1 | 11/2007 | Wood et al. | |
| 2007/0286599 A1 | 12/2007 | Sauer et al. | |
| 2007/0297005 A1 | 12/2007 | Montierth et al. | |
| 2008/0007453 A1 | 1/2008 | Vassilakis et al. | |
| 2008/0013909 A1 | 1/2008 | Kostet et al. | |
| 2008/0013956 A1 | 1/2008 | Ware et al. | |
| 2008/0013957 A1 | 1/2008 | Akers et al. | |
| 2008/0014948 A1 | 1/2008 | Scheinert | |
| 2008/0026765 A1 | 1/2008 | Charbonneau | |
| 2008/0031628 A1 | 2/2008 | Dragas et al. | |
| 2008/0043714 A1 | 2/2008 | Pernu | |
| 2008/0056167 A1 | 3/2008 | Kim et al. | |
| 2008/0058018 A1 | 3/2008 | Scheinert | |
| 2008/0063387 A1 | 3/2008 | Yahata et al. | |
| 2008/0080863 A1 | 4/2008 | Sauer et al. | |
| 2008/0098203 A1 | 4/2008 | Master et al. | |
| 2008/0118014 A1 | 5/2008 | Reunamaki et al. | |
| 2008/0119198 A1 | 5/2008 | Hettstedt et al. | |
| 2008/0124086 A1 | 5/2008 | Matthews | |
| 2008/0124087 A1 | 5/2008 | Hartmann et al. | |
| 2008/0129634 A1 | 6/2008 | Pera et al. | |
| 2008/0134194 A1 | 6/2008 | Liu | |
| 2008/0145061 A1 | 6/2008 | Lee et al. | |
| 2008/0150514 A1 | 6/2008 | Codreanu et al. | |
| 2008/0159226 A1 | 7/2008 | He et al. | |
| 2008/0159744 A1* | 7/2008 | Soto et al. | 398/115 |
| 2008/0166094 A1 | 7/2008 | Bookbinder et al. | |
| 2008/0168283 A1* | 7/2008 | Penning | G06F 1/263 713/310 |
| 2008/0181282 A1 | 7/2008 | Wala et al. | |
| 2008/0194226 A1 | 8/2008 | Rivas et al. | |
| 2008/0207253 A1 | 8/2008 | Jaakkola et al. | |
| 2008/0212969 A1 | 9/2008 | Fasshauer et al. | |
| 2008/0219670 A1 | 9/2008 | Kim et al. | |
| 2008/0232799 A1 | 9/2008 | Kim | |
| 2008/0247716 A1 | 10/2008 | Thomas et al. | |
| 2008/0253351 A1 | 10/2008 | Pernu et al. | |
| 2008/0253773 A1 | 10/2008 | Zheng | |
| 2008/0260388 A1 | 10/2008 | Kim et al. | |
| 2008/0261656 A1 | 10/2008 | Bella et al. | |
| 2008/0268833 A1 | 10/2008 | Huang et al. | |
| 2008/0273844 A1 | 11/2008 | Kewitsch | |
| 2008/0279137 A1 | 11/2008 | Pernu et al. | |
| 2008/0280569 A1 | 11/2008 | Hazani et al. | |
| 2008/0291830 A1 | 11/2008 | Pernu et al. | |
| 2008/0292322 A1 | 11/2008 | Daghighian et al. | |
| 2008/0298813 A1 | 12/2008 | Song et al. | |
| 2008/0304831 A1 | 12/2008 | Miller, II et al. | |
| 2008/0310848 A1 | 12/2008 | Yasuda et al. | |
| 2008/0311944 A1 | 12/2008 | Hansen et al. | |
| 2009/0022304 A1 | 1/2009 | Kubler et al. | |
| 2009/0028087 A1 | 1/2009 | Nguyen et al. | |
| 2009/0028317 A1 | 1/2009 | Ling et al. | |
| 2009/0041413 A1 | 2/2009 | Hurley | |
| 2009/0047023 A1 | 2/2009 | Pescod et al. | |
| 2009/0059903 A1 | 3/2009 | Kubler et al. | |
| 2009/0061796 A1 | 3/2009 | Arkko et al. | |
| 2009/0061939 A1 | 3/2009 | Andersson et al. | |
| 2009/0073916 A1 | 3/2009 | Zhang et al. | |
| 2009/0081985 A1 | 3/2009 | Rofougaran et al. | |
| 2009/0086693 A1 | 4/2009 | Kennedy | |
| 2009/0087181 A1 | 4/2009 | Gray | |
| 2009/0088072 A1 | 4/2009 | Rofougaran et al. | |
| 2009/0092394 A1 | 4/2009 | Wei et al. | |
| 2009/0097855 A1 | 4/2009 | Thelen et al. | |
| 2009/0135078 A1 | 5/2009 | Lindmark et al. | |

(56) References Cited

U.S. PATENT DOCUMENTS

| | | |
|---|---|---|
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0218407 A1 | 9/2009 | Rofougaran |
| 2009/0218657 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0252136 A1 | 10/2009 | Mahany et al. |
| 2009/0252204 A1 | 10/2009 | Shatara et al. |
| 2009/0252205 A1 | 10/2009 | Rheinfelder et al. |
| 2009/0258652 A1 | 10/2009 | Lambert et al. |
| 2009/0285147 A1 | 11/2009 | Subasic et al. |
| 2009/0290632 A1 | 11/2009 | Wegener |
| 2010/0002626 A1 | 1/2010 | Schmidt et al. |
| 2010/0002661 A1 | 1/2010 | Schmidt et al. |
| 2010/0027443 A1 | 2/2010 | LoGalbo et al. |
| 2010/0054227 A1 | 3/2010 | Hettstedt et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0087227 A1 | 4/2010 | Francos et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0144337 A1 | 6/2010 | Dean |
| 2010/0148373 A1 | 6/2010 | Chandrasekaran |
| 2010/0156721 A1 | 6/2010 | Alamouti et al. |
| 2010/0177759 A1 | 7/2010 | Fischer et al. |
| 2010/0177760 A1 | 7/2010 | Cannon et al. |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0202326 A1 | 8/2010 | Rofougaran et al. |
| 2010/0202356 A1 | 8/2010 | Fischer et al. |
| 2010/0208777 A1 | 8/2010 | Ogaz |
| 2010/0215028 A1 | 8/2010 | Fischer |
| 2010/0225413 A1 | 9/2010 | Rofougaran et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0278530 A1 | 11/2010 | Kummetz et al. |
| 2010/0290355 A1 | 11/2010 | Roy et al. |
| 2010/0290787 A1 | 11/2010 | Cox |
| 2010/0291949 A1 | 11/2010 | Shapira et al. |
| 2010/0296458 A1 | 11/2010 | Wala et al. |
| 2010/0296816 A1 | 11/2010 | Larsen |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0021146 A1 | 1/2011 | Pernu |
| 2011/0021224 A1 | 1/2011 | Koskinen et al. |
| 2011/0045767 A1 | 2/2011 | Rofougaran et al. |
| 2011/0055875 A1 | 3/2011 | Zussman |
| 2011/0065450 A1 | 3/2011 | Kazmi |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116393 A1 | 5/2011 | Hong et al. |
| 2011/0116572 A1 | 5/2011 | Lee et al. |
| 2011/0126071 A1 | 5/2011 | Han et al. |
| 2011/0141895 A1 | 6/2011 | Zhang |
| 2011/0149879 A1 | 6/2011 | Noriega et al. |
| 2011/0158298 A1 | 6/2011 | Djadi et al. |
| 2011/0170577 A1 | 7/2011 | Anvari |
| 2011/0170619 A1 | 7/2011 | Anvari |
| 2011/0182230 A1 | 7/2011 | Ohm et al. |
| 2011/0182255 A1 | 7/2011 | Kim et al. |
| 2011/0194475 A1 | 8/2011 | Kim et al. |
| 2011/0201368 A1 | 8/2011 | Faccin et al. |
| 2011/0204504 A1 | 8/2011 | Henderson et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0223958 A1 | 9/2011 | Chen et al. |
| 2011/0223959 A1 | 9/2011 | Chen |
| 2011/0223960 A1 | 9/2011 | Chen et al. |
| 2011/0223961 A1 | 9/2011 | Chen et al. |
| 2011/0227795 A1 | 9/2011 | Lopez et al. |
| 2011/0236024 A1 | 9/2011 | Mao |
| 2011/0237178 A1 | 9/2011 | Seki et al. |
| 2011/0241881 A1 | 10/2011 | Badinelli |
| 2011/0243201 A1 | 10/2011 | Phillips et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0268452 A1 | 11/2011 | Beamon et al. |
| 2011/0274021 A1 | 11/2011 | He et al. |
| 2011/0281536 A1 | 11/2011 | Lee et al. |
| 2012/0314797 A1 | 12/2012 | Kummetz et al. |
| 2013/0012195 A1 | 1/2013 | Sabat, Jr. et al. |
| 2013/0017863 A1 | 1/2013 | Kummetz et al. |
| 2013/0150063 A1 | 6/2013 | Berlin et al. |
| 2013/0188959 A1 | 7/2013 | Cune et al. |
| 2013/0210490 A1 | 8/2013 | Fischer et al. |
| 2014/0016583 A1 | 1/2014 | Smith |
| 2014/0057627 A1 | 2/2014 | Hejazi et al. |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0219140 A1 | 8/2014 | Uyehara et al. |
| 2014/0269859 A1 | 9/2014 | Hanson et al. |
| 2014/0314061 A1 | 10/2014 | Trajkovic et al. |
| 2015/0098351 A1 | 4/2015 | Zavadsky et al. |
| 2015/0098372 A1 | 4/2015 | Zavadsky et al. |
| 2015/0098419 A1 | 4/2015 | Zavadsky et al. |

FOREIGN PATENT DOCUMENTS

| | | |
|---|---|---|
| CA | 2065090 C | 2/1998 |
| CA | 2242707 C | 9/2002 |
| CN | 1745560 A | 3/2006 |
| CN | 101151811 A | 3/2008 |
| CN | 101496306 A | 7/2009 |
| CN | 101542928 A | 9/2009 |
| DE | 19705253 A1 | 8/1998 |
| DE | 20104862 U1 | 9/2001 |
| DE | 10249414 A1 | 5/2004 |
| EP | 0391597 A2 | 10/1990 |
| EP | 0461583 A1 | 12/1991 |
| EP | 0477952 A2 | 4/1992 |
| EP | 0477952 A3 | 4/1992 |
| EP | 0714218 A1 | 5/1996 |
| EP | 0687400 B1 | 11/1998 |
| EP | 0993124 A2 | 4/2000 |
| EP | 1056226 A2 | 11/2000 |
| EP | 1173034 A1 | 1/2002 |
| EP | 1202475 A2 | 5/2002 |
| EP | 1227605 A2 | 7/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1511203 A1 | 3/2005 |
| EP | 1530316 A1 | 5/2005 |
| EP | 1267447 B1 | 8/2006 |

(56) References Cited

FOREIGN PATENT DOCUMENTS

| | | |
|---|---|---|
| EP | 1693974 A1 | 8/2006 |
| EP | 1742388 A1 | 1/2007 |
| EP | 1173034 B1 | 7/2007 |
| EP | 1954019 A1 | 8/2008 |
| EP | 1968250 A1 | 9/2008 |
| EP | 1357683 B1 | 5/2009 |
| EP | 2110955 A1 | 10/2009 |
| EP | 2253980 A1 | 11/2010 |
| EP | 1570626 B1 | 11/2013 |
| GB | 2323252 A | 9/1998 |
| GB | 2366131 A | 2/2002 |
| GB | 2370170 A | 6/2002 |
| GB | 2399963 A | 9/2004 |
| GB | 2428149 A | 1/2007 |
| JP | 05260018 A | 10/1993 |
| JP | 08181661 A | 7/1996 |
| JP | 09083450 A | 3/1997 |
| JP | 09162810 A | 6/1997 |
| JP | 09200840 A | 7/1997 |
| JP | 11068675 A | 3/1999 |
| JP | 11088265 A | 3/1999 |
| JP | 2000152300 A | 5/2000 |
| JP | 2000341744 A | 12/2000 |
| JP | 2002264617 A | 9/2002 |
| JP | 2003148653 A | 5/2003 |
| JP | 2003172827 A | 6/2003 |
| JP | 2004172734 A | 6/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20040053467 A | 6/2004 |
| KR | 20110087949 A | 8/2011 |
| WO | 9603823 A1 | 2/1996 |
| WO | 9748197 A2 | 12/1997 |
| WO | 9935788 A2 | 7/1999 |
| WO | 0042721 A1 | 7/2000 |
| WO | 0178434 A1 | 10/2001 |
| WO | 0184760 A1 | 11/2001 |
| WO | 0221183 A1 | 3/2002 |
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005069203 A3 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2005117337 A1 | 12/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006046088 A1 | 5/2006 |
| WO | 2006051262 A1 | 5/2006 |
| WO | 2006077569 A1 | 7/2006 |
| WO | 2006094441 A1 | 9/2006 |
| WO | 2006133609 A1 | 12/2006 |
| WO | 2006136811 A1 | 12/2006 |
| WO | 2007048427 A1 | 5/2007 |
| WO | 2007075579 A2 | 7/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2009014710 A1 | 1/2009 |
| WO | WO2009/014710 A1 | 1/2009 |
| WO | 2009100395 A1 | 8/2009 |
| WO | 2009100396 A1 | 8/2009 |
| WO | 2009100397 A2 | 8/2009 |
| WO | 2009100398 A2 | 8/2009 |
| WO | WO2009/145789 A1 | 12/2009 |
| WO | 2010087919 A2 | 8/2010 |
| WO | 2010090999 A1 | 8/2010 |
| WO | 2011043172 A1 | 4/2011 |
| WO | 2011112373 A1 | 9/2011 |
| WO | 2011139937 A1 | 11/2011 |
| WO | 2011139939 A1 | 11/2011 |
| WO | 2011139942 A1 | 11/2011 |
| WO | 2011160117 A1 | 12/2011 |
| WO | 2012024345 A2 | 2/2012 |
| WO | 2012051227 A1 | 4/2012 |
| WO | 2012051230 A1 | 4/2012 |
| WO | 2012054553 A1 | 4/2012 |
| WO | 2012170865 A2 | 12/2012 |
| WO | 2013009835 A1 | 1/2013 |
| WO | 2013122915 A1 | 8/2013 |
| WO | 2014022211 A2 | 2/2014 |
| WO | 2014070236 A1 | 5/2014 |
| WO | 2014082070 A1 | 5/2014 |
| WO | 2014082072 A1 | 5/2014 |
| WO | 2014082075 A1 | 5/2014 |
| WO | 2014144314 A1 | 9/2014 |
| WO | 2015054162 A1 | 4/2015 |
| WO | 2015054164 A1 | 4/2015 |
| WO | 2015054165 A1 | 4/2015 |

OTHER PUBLICATIONS

Notification of Grant for Chinese patent application 201190000473.1 issued Aug. 28, 2013, 4 pages.

International Search Report for PCT/US2011/034725 mailed Aug. 5, 2011, 4 pages.

Non-final Office Action for U.S. Appl. No. 12/892,424 mailed Nov. 5, 2012, 22 pages.

International Search Report and Written Opinion for PCT/US2011/034738 mailed Jul. 27, 2011, 13 pages.

International Search Report for PCT/US2011/047821 mailed Oct. 25, 2011, 4 pages.

International Preliminary Report on Patentability for PCT/US2011/047821 mailed Feb. 19, 2013, 10 pages.

Non-final Office Action for U.S. Appl. No. 13/025,719 mailed Sep. 11, 2013, 18 pages.

Parker et al., "Radio-over-fibre technologies arising from the Building the future Optical Network in Europe (BONE) project," IET Optoelectron., 2010, vol. 4, Issue 6, pp. 247-259.

Singh et al., "Distributed coordination with deaf neighbors: efficient medium access for 60 GHz mesh networks," IEEE INFOCOM 2010 proceedings, 9 pages.

Examination Report for European patent application 11754570.7 mailed Nov. 18, 2013, 7 pages.

Final Office Action for U.S. Appl. No. 13/025,719 mailed Dec. 31, 2013, 20 pages.

Advisory Action for U.S. Appl. No. 13/025,719 mailed Mar. 14, 2014, 6 pages.

Non-final Office Action for U.S. Appl. No. 13/785,603 mailed Dec. 23, 2013, 15 pages.

Final Office Action for U.S. Appl. No. 13/785,603 mailed Apr. 14, 2014, 17 pages.

Advisory Action for U.S. Appl. No. 13/785,603 mailed Jun. 30, 2014, 3 pages.

(56) References Cited

OTHER PUBLICATIONS

Non-final Office Action for U.S. Appl. No. 13/785,603 mailed Sep. 9, 2014, 10 pages.
Final Office Action for U.S. Appl. No. 13/785,603 mailed Dec. 4, 2014, 8 pages.
Non-final Office Action for U.S. Appl. No. 13/762,432 mailed Aug. 20, 2014, 4 pages.
Notice of Allowance for U.S. Appl. No. 13/762,432 mailed Dec. 24, 2014, 7 pages.
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.
International Search Report for PCT/US2011/055861 mailed Feb. 7, 2012, 4 pages.
International Preliminary Report on Patentability for PCT/US2011/055861 mailed Apr. 25, 2013, 9 pages.
International Search Report for PCT/US2011/055858 mailed Feb. 7, 2012, 4 pages.
International Preliminary Report on Patentability for PCT/US2011/055858 mailed Apr. 25, 2013, 8 pages.
International Search Report for PCT/US2011/034733 mailed Aug. 1, 2011, 5 pages.
International Preliminary Report on Patentability for PCT/US2011/034733 mailed Nov. 15, 2012, 8 pages.
First Office Action for Chinese patent application 201180024499.4 mailed Dec. 1, 2014, 13 pages.
Examination Report for European patent application 11754570.7 mailed Jan. 13, 2015, 5 pages.
Non-final Office Action for U.S. Appl. No. 13/025,719 mailed Mar. 31, 2015, 26 pages.
Cooper, A.J., "Fibre/Radio for the Provision of Cordless/Mobile Telephony Services in the Access Network," Electronics Letters, 1990, pp. 2054-2056, vol. 26, No. 24.
Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12.
Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.
Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.
International Search Report for PCT/US07/21041 mailed Mar. 7, 2008, 3 pages.
No Author, "ITU-T G.652, Telecommunication Standardization Sector of ITU, Series G: Transmission Systems and Media, Digital Systems and Networks, Transmission Media Characteristics—Optical Fibre Cables, Characteristics of a Single-Mode Optical Fiber and Cable," ITU-T Recommendation G.652, International Telecommunication Union, Jun. 2005, 20 pages.
No Author, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 19 pages.
Kojucharow, K., et al., "Millimeter-Wave Signal Properties Resulting from Electrooptical Upconversion," IEEE Transactions on Microwave Theory and Techniques, Oct. 2001, vol. 49, No. 10, pp. 1977-1985.
Monro, T.M., et al., "Holey Fibers with Random Cladding Distributions," Optics Letters, Feb. 15, 2000, vol. 25, No. 4, pp. 206-208.
Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.

Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.
Paulraj, A.J., et al., "An Overview of MIMO Communications—A Key to Gigabit Wireless," Proceedings of the IEEE, Feb. 2004, vol. 92, No. 2, 34 pages.
Pickrell, G.R., et al., "Novel Techniques for the Fabrication of Holey Optical Fibers," Proceedings of SPIE, Oct. 28-Nov. 2, 2001, vol. 4578, 2002, pp. 271-282.
No Author, RFID Technology Overview, 11 pages.
Roh, W., et al., "MIMO Channel Capacity for the Distributed Antenna Systems," Proceedings of the 56th IEEE Vehicular Technology Conference, Sep. 2002, vol. 2, pp. 706-709.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept in Wireless Network Infrastructure," Electronics Letters, Feb. 27, 1997, vol. 33, No. 5, pp. 404-406.
Winters, J., et al., "The Impact of Antenna Diversity on the Capacity of Wireless Communication Systems," IEEE Transactions on Communications, vol. 42, No. 2/3/4, Feb./Mar./Apr. 1994, pp. 1740-1751.
Opatic, D., "Radio over Fiber Technology for Wireless Access," Ericsson, Oct. 17, 2009, 6 pages.
Author Unknown, "ADC Has 3rd Generation Services Covered at CeBIT 2001," Business Wire, Mar. 20, 2001, 3 pages.
Author Unknown, "Andrew Unveils the InCell Fiber Optic Antenna System for In-Building Wireless Communications," Fiber Optics Weekly Update, Dec. 1, 2000, Information Gatekeepers Inc., pp. 3-4.
Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.
Fitzmaurice, M. et al., "Distributed Antenna System for Mass Transit Communications," Vehicular Technology Conference, Boston, Massachusetts, Sep. 2000, IEEE, pp. 2011-2018.
Ghafouri-Shiraz, et al., "Radio on Fibre Communication Systems Based on Integrated Circuit-Antenna Modules," Microwave and Millimeter Wave Technology Proceedings, Beijing, China, Aug. 1998, IEEE, pp. 159-169.
Griffin, R.A. et al., "Radio-Over-Fiber Distribution Using an Optical Millimeter-Wave/DWDM Overlay," Optical Fiber Communication Conference, San Diego, California, Feb. 1999, IEEE, pp. 70-72.
Juntunen, J. et al., "Antenna Diversity Array Design for Mobile Communication Systems," Proceedings of the 2000 IEEE International Conference on Phased Array Systems and Technology, Dana Point, California, May 2000, IEEE, pp. 65-67.
Lee, D. et al., "Ricocheting Bluetooth," 2nd International Conference on Microwave and Millimeter Wave Technology Proceedings, Beijing, China, Sep. 2000, IEEE, pp. 432-435.
Lee, T., "A Digital Multiplexed Fiber Optic Transmission System for Analog Audio Signals," IEEE Western Canada Conference on Computer, Power, and Communications Systems in a Rural Environment, Regina, Saskatchewan, May 1991, pp. 146-149.
Schuh et al., "Hybrid Fibre Radio Access: A Network Operators Approach and Requirements," Proceedings of the 10th Microcoll Conference, Mar. 21-24, 1999, Budapest, Hungary, pp. 211-214.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Margotte, B. et al., "Fibre Optic Distributed Antenna System for Cellular and PCN/PCS Indoor Coverage," Microwave Engineering Europe, Jun. 1998, 6 pages.
Matsunaka et al., "Point-to-multipoint Digital Local Distribution Radio System in the 21 GHz Band," KDD Technical Journal, Mar. 1991, No. 145, p. 43-54.

(56) References Cited

OTHER PUBLICATIONS

Translation of the First Office Action for Chinese patent application 201180039569.3 issued Jan. 16, 2015, 7 pages.
Advisory Action for U.S. Appl. No. 14/711,306 mailed Oct. 8, 2015, 3 pages.
Examination Report for European patent application 11721160.7 mailed Oct. 21, 2015, 7 pages.
Final Office Action for U.S. Appl. No. 14/711,306 mailed Jul. 9, 2015, 16 pages.
Translation of the Second Office Action for Chinese patent application 201180024499.4 issued Aug. 17, 2015, 3 pages.

* cited by examiner

PROVIDING DIGITAL DATA SERVICES AS ELECTRICAL SIGNALS AND RADIO-FREQUENCY (RF) COMMUNICATIONS OVER OPTICAL FIBER IN DISTRIBUTED COMMUNICATIONS SYSTEMS, AND RELATED COMPONENTS AND METHODS

PRIORITY APPLICATIONS

This application is a continuation of International Application No. PCT/US12/25337 filed Feb. 16, 2012, which claims the benefit of priority U.S. Provisional Application No. 61/444,922, filed Feb. 21, 2011, both applications being incorporated herein by reference.

RELATED APPLICATIONS

This application is related to International Application PCT/US2011/034738, filed May 2, 2011, and to U.S. patent application Ser. No. 12/892,424, filed on Sep. 28, 2010, entitled "Providing Digital Data Services in Optical Fiber-based Distributed Radio Frequency (RF) Communications Systems, and Related Components and Methods," each of which are incorporated herein by reference in their entireties.

This application is also related to International Application PCT/US11/34725, filed May 2, 2011, and to U.S. patent application Ser. No. 13/025,719, filed Feb. 11, 2011, entitled "Digital Data Services and/or Power Distribution in Optical Fiber-Based Distributed Communications Systems Providing Digital Data and Radio Frequency (RF) Communications Services, and Related Components and Methods."

This application is also related to International Application. PCT/US11/34733, filed on May 2, 2011, entitled "Optical Fiber-based Distributed Communications Systems, and Related Components and Methods," which is incorporated herein by reference in its entirety.

This application is also related to International Application PCT/US11/55858, filed Oct. 12, 2011, entitled "Local Power Management For Remote Antenna Units In Distributed Antenna Systems," which is incorporated herein by reference in its entirety.

This application is also related to International Application PCT/US11/55861, filed Oct. 12, 2011, entitled "Remote Power Management For Remote Antenna Units In Distributed Antenna Systems," which is incorporated herein by reference in its entirety.

BACKGROUND

1. Field of the Disclosure

The technology of the disclosure relates to distributing digital data communications and radio-frequency (RF) communications over optical fiber in distributed antenna systems.

2. Technical Background

Wireless communication is rapidly growing, with ever-increasing demands for high-speed mobile data communication. As an example, so-called "wireless fidelity" or "WiFi" systems and wireless local area networks (WLANs) are being deployed in many different types of areas (e.g., coffee shops, airports, libraries, etc.). Distributed antenna systems communicate with wireless devices called "clients," which must reside within the wireless range or "cell coverage area" in order to communicate with an access point device.

One approach to deploying a distributed antenna system involves the use of radio frequency (RF) antenna coverage areas, also referred to as "antenna coverage areas." Antenna coverage areas can have a radius in the range from a few meters up to twenty meters as an example. Combining a number of access point devices creates an array of antenna coverage areas. Because the antenna coverage areas each cover small areas, there are typically only a few users (clients) per antenna coverage area. This allows for minimizing the amount of RF bandwidth shared among the wireless system users. It may be desirable to provide antenna coverage areas in a building or other facility to provide distributed antenna system access to clients within the building or facility. However, it may be desirable to employ optical fiber to distribute communication signals. Benefits of optical fiber include increased bandwidth.

One type of distributed antenna system for creating antenna coverage areas, called "Radio-over-Fiber" or "RoF," utilizes RF signals sent over optical fibers. Such systems can include a head-end station optically coupled to a plurality of remote antenna units that each provides antenna coverage areas. The remote antenna units can each include RF transceivers coupled to an antenna to transmit RF signals wirelessly, wherein the remote antenna units are coupled to the head-end station via optical fiber links. The RF transceivers in the remote antenna units are transparent to the RF signals. The remote antenna units convert incoming optical RF signals from an optical fiber downlink to electrical RF signals via optical-to-electrical (O/E) converters, which are then passed to the RF transceiver. The RF transceiver converts the electrical RF signals to electromagnetic signals via antennas coupled to the RF transceiver provided in the remote antenna units. The antennas also receive electromagnetic signals (i.e., electromagnetic radiation) from clients in the antenna coverage area and convert them to electrical RF signals (i.e., electrical RF signals in wire). The remote antenna units then convert the electrical RF signals to optical RF signals via electrical-to-optical (E/O) converters. The optical RF signals are then sent over an optical fiber uplink to the head-end station.

SUMMARY OF THE DETAILED DESCRIPTION

Embodiments disclosed in the detailed description include distributed antenna systems that provide and support both radio frequency (RF) communication services and digital data services. The RF communication services can also be distributed over optical fiber to client devices, such as remote communications units for example. The remote communications units may support wireless, wired, or both wireless and wired communications services. The digital data services can be distributed over electrical signals to client devices, such as remote communications units for example. For example, non-limiting examples of digital data services include Ethernet, WLAN, Worldwide Interoperability for Microwave Access (WiMax), Wireless Fidelity (WiFi), Digital Subscriber Line (DSL), and Long Term Evolution (LTE), etc. Power can also be distributed over an electrical medium that is provided to distribute digital data services, if desired, to provide power to remote communications devices and/or client devices coupled to the remote communications devices for operation. In this manner, as an example, the same electrical medium used to transport digital data signals in the distributed antenna system can also be employed to provide power to the remote communications devices and/or client devices coupled to the remote communications devices. Power may be injected and switched from two or more power sources over selected electrical medium to distribute power for power-consuming components supporting both RF communications services and digital data services.

In this regard, in one embodiment, a power unit for distributing power in a distributed antenna system is provided. The power unit comprises a plurality of electrical input links each configured to convey digital data signals and power signals. The power unit further comprises at least one electrical communications output configured to distribute the digital data signals to at least one communications interface of at least one remote antenna unit (RAU). The power unit further comprises at least one electrical power output configured to distribute the power signals to at least one power interface of the RAU and a circuit configured to couple electrically the electrical input link among the plurality of electrical input links containing power signals to at least one electrical power output.

In another embodiment, a method for distributing power in a distributed antenna system using a power unit is provided. The method comprises conveying convey digital data signals and power signals through a plurality of electrical input links and distributing the digital data signals to at least one communications interface of at least one remote antenna unit (RAU) through at least one electrical communications output. The method further comprises distributing the power signals to at least one power interface of the at least one RAU through at least one electrical power output; and electrically coupling, with a circuit, an electrical input link among the plurality of electrical input links containing power signals to at least one electrical power output.

In another embodiment, a distributed antenna system is provided. The distributed antenna system comprises at least one remote antenna unit (RAU). The RAU comprises an optical input and a data medium input. The data medium input comprises a data input and a power input. The distributed antenna system further comprises an optical fiber configured to couple head-end equipment (HEE) to the at least one RAU through the optical input, the optical fiber configured to carry radio frequency (RF) communications signals thereon between the HEE and the at least one RAU; an electrical medium comprising at least one data path and at least one power path, the electrical medium configured to convey digital data services and power between the HEE and the at least one RAU; and circuitry configured to direct power onto the at least one power path.

Additional features and advantages will be set forth in the detailed description which follows, and in part will be readily apparent to those skilled in the art from that description or recognized by practicing the embodiments as described herein, including the detailed description that follows, the claims, as well as the appended drawings.

It is to be understood that both the foregoing general description and the following detailed description present embodiments, and are intended to provide an overview or framework for understanding the nature and character of the disclosure. The accompanying drawings are included to provide a further understanding, and are incorporated into and constitute a part of this specification. The drawings illustrate various embodiments, and together with the description serve to explain the principles and operation of the concepts disclosed.

DETAILED DESCRIPTION

Reference will now be made in detail to the embodiments, examples of which are illustrated in the accompanying drawings, in which some, but not all embodiments are shown. Indeed, the concepts may be embodied in many different forms and should not be construed as limiting herein; rather, these embodiments are provided so that this disclosure will satisfy applicable legal requirements. Whenever possible, like reference numbers will be used to refer to like components or parts.

Embodiments disclosed in the detailed description include distributed antenna systems that provide and support both radio frequency (RF) communication services and digital data services. The RF communication services can also be distributed over optical fiber to client devices, such as remote communications units for example. The remote communications units may support wireless, wired, or both wireless and wired communications services. The digital data services can be distributed over electrical signals to client devices, such as remote communications units for example. For example, non-limiting examples of digital data services include Ethernet, WLAN, Worldwide Interoperability for Microwave Access (WiMax), Wireless Fidelity (WiFi), Digital Subscriber Line (DSL), and Long Term Evolution (LTE), etc. Power can also be distributed over an electrical medium that is provided to distribute digital data services, if desired, to provide power to remote communications devices and/or client devices coupled to the remote communications devices for operation. In this manner, as an example, the same electrical medium used to transport digital data signals in the distributed antenna system can also be employed to provide power to the remote communications devices and/or client devices coupled to the remote communications devices. Power may be injected and switched from two or more power sources over selected electrical medium to distribute power for power-consuming components supporting both RF communications services and digital data services.

Figure 1:
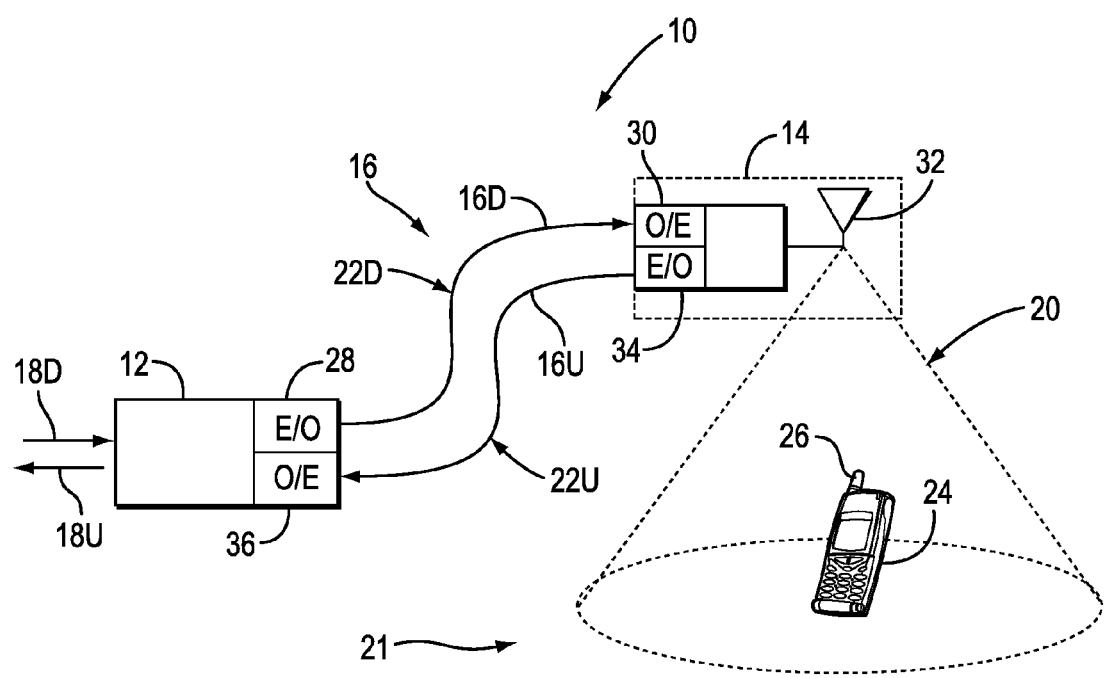
FIG. 1 is a schematic diagram of an exemplary optical fiber-based distributed antenna system.
Figure 2:
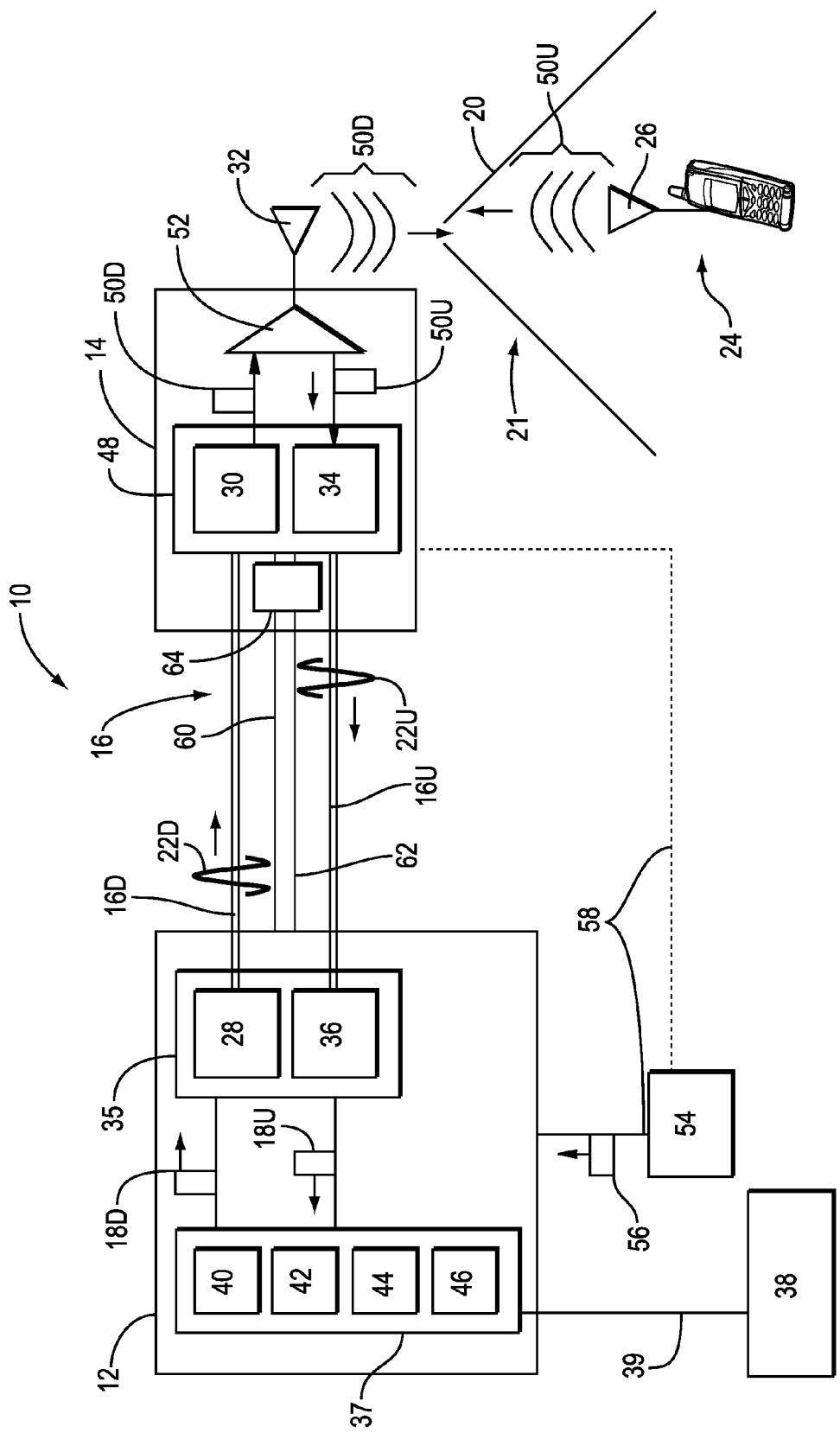
FIG. 2 is a more detailed schematic diagram of exemplary head-end equipment and a remote antenna unit (RAU) that can be deployed in the optical fiber-based distributed antenna system of FIG. 1.
Figure 3:
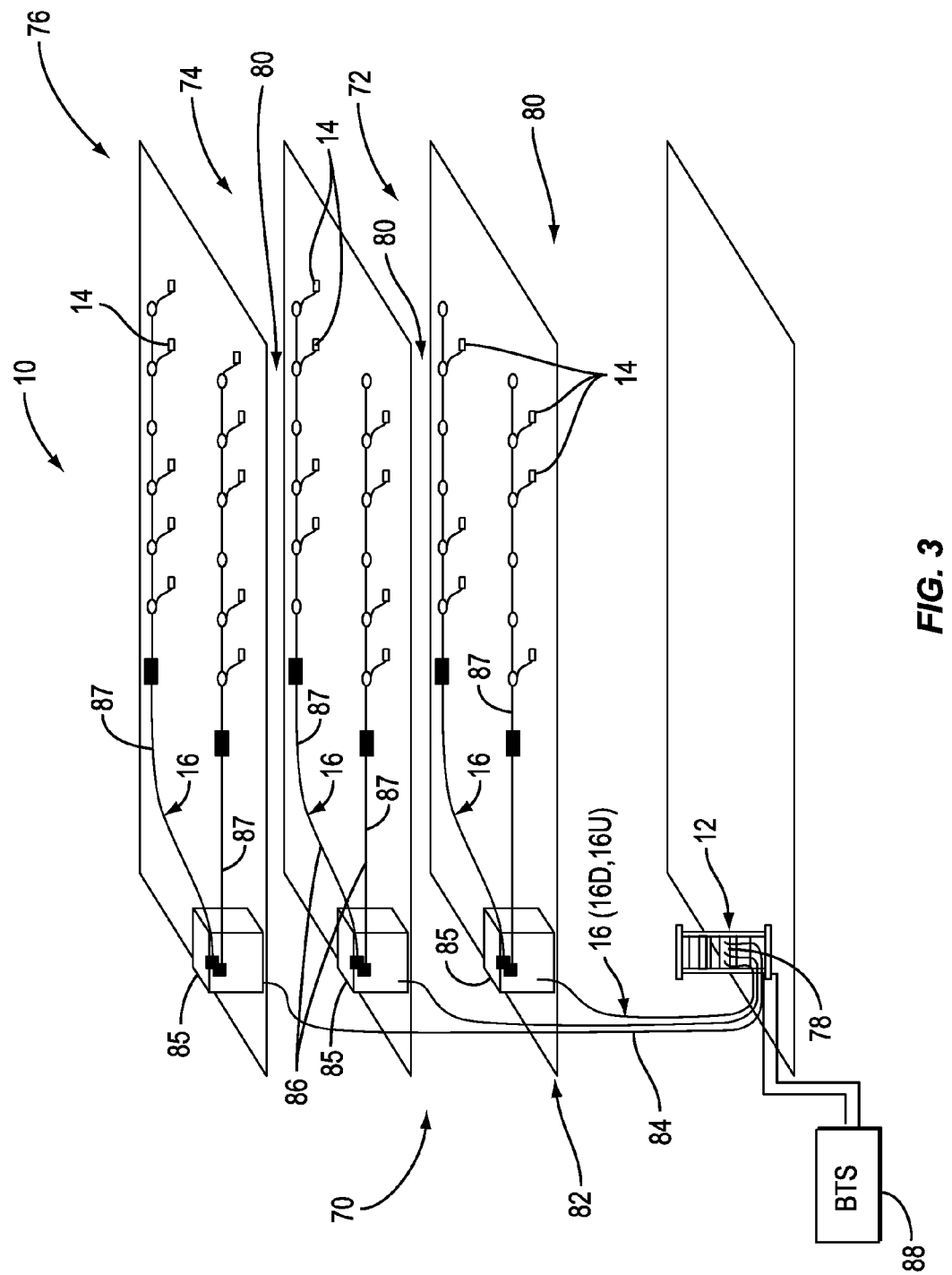
FIG. 3 is a partially schematic cut-away diagram of an exemplary building infrastructure in which the optical fiber-based distributed antenna system in FIG. 1 can be employed.

Before discussing examples of distributed antenna systems that distribute digital data services as electrical signals and RF communication services as optical signals, an exemplary optical fiber-based distributed antenna system that provides RF communication services without providing digital data services is first described with regard to FIGS. 1-3. Various embodiments of additionally providing digital data services in conjunction with RF communication services in optical fiber-based distributed antenna systems starts at FIG. 4.

In this regard, FIG. 1 is a schematic diagram of an embodiment of an optical fiber-based distributed antenna system. In this embodiment, the system is an optical fiber-based distributed antenna system 10 that is configured to create one or more antenna coverage areas for establishing communications with wireless client devices located in the RF range of the antenna coverage areas. The optical fiber-based distributed antenna system 10 provides RF communication services (e.g., cellular services). In this embodiment, the optical fiber-based distributed antenna system 10 includes head-end equipment (HEE) 12 such as a head-end unit (HEU), one or more remote antenna units (RAUs) 14, and an optical fiber 16 that optically couples HEE 12 to the RAU 14. The RAU 14 is a type of remote communications unit. In general, a remote communications unit can support either wireless communications, wired communications, or both. The RAU 14 can support wireless communications and may also support wired communications. The HEE 12 is configured to receive communications over downlink electrical RF signals 18D from a source or sources, such as a network or carrier as examples, and provide such communications to the RAU 14. The HEE 12 is also configured to return communications received from the RAU 14, via uplink electrical RF signals 18U, back to the source or sources. In this regard in this embodiment, the optical fiber 16 includes at least one downlink optical fiber 16D to carry signals communicated from the HEE 12 to the RAU 14 and at least one uplink optical fiber 16U to carry signals communicated from the RAU 14 back to the HEE 12. One downlink optical fiber 16D and one uplink optical fiber 16U could be provided to support multiple channels each using wave-division multiplexing (WDM), as discussed in U.S. patent application Ser. No. 12/892,424, entitled "Providing Digital Data Services in Optical Fiber-based Distributed Radio Frequency (RF) Communications Systems, And Related Components and Methods," incorporated herein by reference in its entirety.

The optical fiber-based distributed antenna system 10 has an antenna coverage area 20 that can be disposed about the RAU 14. The antenna coverage area 20 of the RAU 14 forms an RF coverage area 21. The HEE 12 is adapted to perform or to facilitate any one of a number of Radio-over-Fiber (RoF) applications, such as RF identification (RFID), wireless local-area network (WLAN) communication, or cellular phone service. Shown within the antenna coverage area 20 is a client device 24 in the form of a mobile device as an example, which may be a cellular telephone as an example. The client device 24 can be any device that is capable of receiving RF communication signals. The client device 24 includes an antenna 26 (e.g., a wireless card) adapted to receive and/or send electromagnetic RF signals.

With continuing reference to FIG. 1, to communicate the electrical RF signals over the downlink optical fiber 16D to the RAU 14, to in turn be communicated to the client device 24 in the antenna coverage area 20 formed by the RAU 14, the HEE 12 includes an electrical-to-optical (E/O) converter 28. The E/O converter 28 converts the downlink electrical RF signals 18D to downlink optical RF signals 22D to be communicated over the downlink optical fiber 16D. The RAU 14 includes an optical-to-electrical (O/E) converter 30 to convert received downlink optical RF signals 22D back to electrical RF signals to be communicated wirelessly through an antenna 32 of the RAU 14 to client devices 24 located in the antenna coverage area 20.

Similarly, the antenna 32 is also configured to receive wireless RF communications from client devices 24 in the antenna coverage area 20. In this regard, the antenna 32 receives wireless RF communications from client devices 24 and communicates electrical RF signals representing the wireless RF communications to an E/O converter 34 in the RAU 14. The E/O converter 34 converts the electrical RF signals into uplink optical RF signals 22U to be communicated over the uplink optical fiber 16U. An O/E converter 36 provided in the HEE 12 converts the uplink optical RF signals 22U into uplink electrical RF signals, which can then be communicated as uplink electrical RF signals 18U back to a network or other source. The HEE 12 in this embodiment is not able to distinguish the location of the client devices 24 in this embodiment. The client device 24 could be in the range of any antenna coverage area 20 formed by an RAU 14.

FIG. 2 is a more detailed schematic diagram of the exemplary optical fiber-based distributed antenna system of FIG. 1 that provides electrical RF service signals for a particular RF service or application. In an exemplary embodiment, the HEE 12 includes a service unit 37 that provides electrical RF service signals by passing (or conditioning and then passing) such signals from one or more outside networks 38 via a network link 39. In a particular example embodiment, this includes providing Cellular signal distribution in the frequency range from 400 MHz to 2.7 GigaHertz (GHz). Any other electrical RF signal frequencies are possible. In another exemplary embodiment, the service unit 37 provides electrical RF service signals by generating the signals directly. In another exemplary embodiment, the service unit 37 coordinates the delivery of the electrical RF service signals between client devices 24 within the antenna coverage area 20.

With continuing reference to FIG. 2, the service unit 37 is electrically coupled to the E/O converter 28 that receives the downlink electrical RF signals 18D from the service unit 37 and converts them to corresponding downlink optical RF signals 22D. In an exemplary embodiment, the E/O converter 28 includes a laser suitable for delivering sufficient dynamic range for the RoF applications described herein, and optionally includes a laser driver/amplifier electrically coupled to the laser. Examples of suitable lasers for the E/O converter 28 include, but are not limited to, laser diodes, distributed feedback (DFB) lasers, Fabry-Perot (FP) lasers, and vertical cavity surface emitting lasers (VCSELs).

With continuing reference to FIG. 2, the HEE 12 also includes the O/E converter 36, which is electrically coupled to the service unit 37. The O/E converter 36 receives the uplink optical RF signals 22U and converts them to corresponding uplink electrical RF signals 18U. In an example embodiment, the O/E converter 36 is a photodetector, or a photodetector electrically coupled to a linear amplifier. The E/O converter 28 and the O/E converter 36 constitute a "converter pair" 35, as illustrated in FIG. 2.

In accordance with an exemplary embodiment, the service unit 37 in the HEE 12 can include an RF signal conditioner unit 40 for conditioning the downlink electrical RF signals 18D and the uplink electrical RF signals 18U, respectively. The service unit 37 can include a digital signal processing unit ("digital signal processor") 42 for providing to the RF signal conditioner unit 40 an electrical signal that is modulated onto an RF carrier to generate a desired downlink electrical RF signal 18D. The digital signal processor 42 is also configured to process a demodulation signal provided by the demodulation of the uplink electrical RF signal 18U by the RF signal conditioner unit 40. The HEE 12 can also include an optional central processing unit (CPU) 44 for processing data and otherwise performing logic and computing operations, and a memory unit 46 for storing data, such as data to be transmitted over a WLAN or other network for example.

With continuing reference to FIG. 2, the RAU 14 also includes a converter pair 48 comprising the O/E converter 30 and the E/O converter 34. The O/E converter 30 converts the received downlink optical RF signals 22D from the HEE 12 back into downlink electrical RF signals 50D. The E/O converter 34 converts uplink electrical RF signals 50U received from the client device 24 into the uplink optical RF signals 22U to be communicated to the HEE 12. The O/E converter 30 and the E/O converter 34 are electrically coupled to the antenna 32 via an RF signal-directing element 52, such as a circulator for example. The RF signal-directing element 52 serves to direct the downlink electrical RF signals 50D and the uplink electrical RF signals 50U, as discussed below. In accordance with an exemplary embodiment, the antenna 32 can include any type of antenna, including but not limited to one or more patch antennas, such as disclosed in U.S. patent application Ser. No. 11/504,999, filed Aug. 16, 2006 entitled "Radio-over-Fiber Transponder With A Dual-Band Patch Antenna System," and U.S. patent application Ser. No. 11/451,553, filed Jun. 12, 2006 entitled "Centralized Optical Fiber-Based Wireless Picocellular Systems and Methods," both of which are incorporated herein by reference in their entireties.

With continuing reference to FIG. 2, the optical fiber-based distributed antenna system 10 also includes a power supply 54 that provides an electrical power signal 56. The power supply 54 is electrically coupled to the HEE 12 for powering the power-consuming elements therein. In an exemplary embodiment, an electrical power line 58 runs through the HEE 12 and over to the RAU 14 to power the O/E converter 30 and the E/O converter 34 in the converter pair 48, the optional RF signal-directing element 52 (unless the RF signal-directing element 52 is a passive device such as a circulator for example), and any other power-consuming elements provided. In an exemplary embodiment, the electrical power line 58 includes two wires 60 and 62 that carry a single voltage and are electrically coupled to a DC power converter 64 at the RAU 14. The DC power converter 64 is electrically coupled to the O/E converter 30 and the E/O converter 34 in the converter pair 48, and changes the voltage or levels of the electrical power signal 56 to the power level(s) required by the power-consuming components in the RAU 14. In an exemplary embodiment, the DC power converter 64 is either a DC/DC power converter or an AC/DC power converter, depending on the type of electrical power signal 56 carried by the electrical power line 58. In another example embodiment, the electrical power line 58 (dashed line) runs directly from the power supply 54 to the RAU 14 rather than from or through the HEE 12. In another example embodiment, the electrical power line 58 includes more than two wires and may carry multiple voltages.

To provide further exemplary illustration of how an optical fiber-based distributed antenna system can be deployed indoors, FIG. 3 is provided. FIG. 3 is a partially schematic cut-away diagram of a building infrastructure 70 employing an optical fiber-based distributed antenna system. The system may be the optical fiber-based distributed antenna system 10 of FIGS. 1 and 2. The building infrastructure 70 generally represents any type of building in which the optical fiber-based distributed antenna system 10 can be deployed. As previously discussed with regard to FIGS. 1 and 2, the optical fiber-based distributed antenna system 10 incorporates the HEE 12 to provide various types of communication services to coverage areas within the building infrastructure 70, as an example. For example, as discussed in more detail below, the optical fiber-based distributed antenna system 10 in this embodiment is configured to receive wireless RF signals and convert the RF signals into RoF signals to be communicated over the optical fiber 16 to multiple RAUs 14. The optical fiber-based distributed antenna system 10 in this embodiment can be, for example, an indoor distributed antenna system (IDAS) to provide wireless service inside the building infrastructure 70. These wireless signals can include cellular service, wireless services such as RFID tracking, Wireless Fidelity (WiFi), local area network (LAN), WLAN, public safety, wireless building automations, and combinations thereof, as examples.

With continuing reference to FIG. 3, the building infrastructure 70 in this embodiment includes a first (ground) floor 72, a second floor 74, and a third floor 76. The floors 72, 74, 76 are serviced by the HEE 12 through a main distribution frame 78 to provide antenna coverage areas 80 in the building infrastructure 70. Only the ceilings of the floors 72, 74, 76 are shown in FIG. 3 for simplicity of illustration. In the example embodiment, a main cable 82 has a number of different sections that facilitate the placement of a large number of RAUs 14 in the building infrastructure 70. Each RAU 14 in turn services its own coverage area in the antenna coverage areas 80. The main cable 82 can include, for example, a riser cable 84 that carries all of the downlink and uplink optical fibers 16D, 16U to and from the HEE 12. The riser cable 84 may be routed through an interconnect unit (ICU) 85. The ICU 85 may be provided as part of or separate from the power supply 54 in FIG. 2. The ICU 85 may also be configured to provide power to the RAUs 14 via the electrical power line 58, as illustrated in FIG. 2 and discussed above, provided inside an array cable 87, or tail cable or home-run tether cable as other examples, and distributed with the downlink and uplink optical fibers 16D, 16U to the RAUs 14. The main cable 82 can include one or more multi-cable (MC) connectors adapted to connect select downlink and uplink optical fibers 16D, 16U, along with an electrical power line, to a number of optical fiber cables 86.

The main cable 82 enables multiple optical fiber cables 86 to be distributed throughout the building infrastructure 70 (e.g., fixed to the ceilings or other support surfaces of each floor 72, 74, 76) to provide the antenna coverage areas 80 for the first, second, and third floors 72, 74, and 76. In an example embodiment, the HEE 12 is located within the building infrastructure 70 (e.g., in a closet or control room), while in another example embodiment, the HEE 12 may be located outside of the building infrastructure 70 at a remote location. A base transceiver station (BTS) 88, which may be provided by a second party such as a cellular service provider, is connected to the HEE 12, and can be co-located or located remotely from the HEE 12. A BTS is any station or signal source that provides an input signal to the HEE 12 and can receive a return signal from the HEE 12. In a typical cellular system, for example, a plurality of BTSs are deployed at a plurality of remote locations to provide wireless telephone coverage. Each BTS serves a corresponding cell and when a mobile client device enters the cell, the BTS communicates with the mobile client device. Each BTS can include at least one radio transceiver for enabling communication with one or more subscriber units operating within the associated cell. As another example, wireless repeaters or bi-directional amplifiers could also be used to serve a corresponding cell in lieu of a BTS. Alternatively, radio input could be provided by a repeater, picocell or femtocell as other examples.

The optical fiber-based distributed antenna system 10 in FIGS. 1-3 and described above provides point-to-point communications between the HEE 12 and the RAU 14. A multi-point architecture is also possible as well. With regard to FIGS. 1-3, each RAU 14 communicates with the HEE 12 over a distinct downlink and uplink optical fiber pair to provide the point-to-point communications. Whenever an RAU 14 is installed in the optical fiber-based distributed antenna system 10, the RAU 14 is connected to a distinct downlink and uplink optical fiber pair connected to the HEE 12. The downlink and uplink optical fibers 16D, 16U may be provided in a fiber optic cable. Multiple downlink and uplink optical fiber pairs can be provided in a fiber optic cable to service multiple RAUs 14 from a common fiber optic cable. For example, with reference to FIG. 3, RAUs 14 installed on a given floor 72, 74, or 76 may be serviced from the same optical fiber 16. In this regard, the optical fiber 16 may have multiple nodes where distinct downlink and uplink optical fiber pairs can be connected to a given RAU 14. One downlink optical fiber 16D could be provided to support multiple channels each using wavelength-division multiplexing (WDM), as discussed in U.S. patent application Ser. No. 12/892,424 entitled "Providing Digital Data Services in Optical Fiber-based Distributed Radio Frequency (RF) Communications Systems, And Related Components and Methods," incorporated herein by reference in its entirety. Other options for WDM and frequency-division multiplexing (FDM) are also disclosed in U.S. patent application Ser. No. 12/892,424, any of which can be employed in any of the embodiments disclosed herein.

The HEE 12 may be configured to support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

It may be desirable to provide both digital data services and RF communication services for client devices. For example, it may be desirable to provide digital data services and RF communication services in the building infrastructure 70 to client devices located therein. Wired and wireless devices may be located in the building infrastructure 70 that are configured to access digital data services. Examples of digital data services include, but are not limited to, Ethernet, WLAN, Worldwide Interoperability for Microwave Access (WiMax), Wireless Fidelity (WiFi), Digital Subscriber Line (DSL), and Long Term Evolution (LTE), etc. Ethernet standards could be supported, including but not limited to 100 Megabits per second (Mbs) (i.e., fast Ethernet) or Gigabit (Gb) Ethernet, or ten Gigabit (10G) Ethernet. Examples of digital data devices include, but are not limited to, wired and wireless servers, wireless access points (WAPs), gateways, desktop computers, hubs, switches, remote radio heads (RRHs), baseband units (BBUs), and femtocells. A separate digital data services network can be provided to provide digital data services to digital data devices.

In this regard, the optical-fiber based distributed antenna system 10 in FIGS. 1-3 can be modified to provide such digital data services over optical fiber in the optical fiber-based distributed antenna system 10 in FIGS. 1-3. The RF communication services and digital data services can be distributed over optical fiber to client devices, such as RAUs for example. Digital data services can be distributed over optical fiber separate from the optical fiber distributing RF communication services. Alternatively, digital data services can be both distributed over common optical fiber with RF communication services in an optical fiber-based distributed antenna system. For example, digital data services can be distributed over common optical fiber with RF communication services at different wavelengths through WDM and/or at different frequencies through FDM. Examples of providing digital data services in an optical-fiber based distributed antenna system are disclosed in co-pending U.S. Patent Application Nos. [HI10-043], 61/330,385 [HI10-043P], [HI10-045-P2], 61/330,386 [HI10-045-P], Ser. No. 12/892,424 [HI10-045]], all of which are incorporated herein by reference in their entireties.

However, it may be desired to provide digital data services in a distributed antenna system as electrical signals over an electrical communication medium instead of optical signals communicated over optical fiber. In this regard, it would not be required to convert the digital data services for downlink services from electrical signals to optical signals for distribution over optical fiber to RAUs, where the optical signals for the digital data services are converted back to electrical signals, and vice versa for uplink distribution. For example, it may be more desirable to distribute the digital data services over an electrical signal medium. For example, an installation site for a distributed antenna system may already include digital data services distributed over an existing electrical signal medium. When integrating or adding RF communication services to be distributed over optical fiber, only optical fiber for the RF communication services would need to be deployed. The existing electrical signal medium could be used or reused when integrating the distribution of digital data services and RF communication services in the distributed antenna system. In this regard, a distributed antenna system can be provided to provide digital data services and RF communication services. Such a distributed antenna system could be provided by modifying or altering the optical-fiber based distributed antenna system 10 in FIGS. 1-3 if desired, as an example. The RF communication services and digital data services can be distributed over optical fiber to client devices, such as RAUs for example. Digital data services can be distributed over an electrical signal medium separate from the optical fiber distributing the RF communication services.

Figure 4:
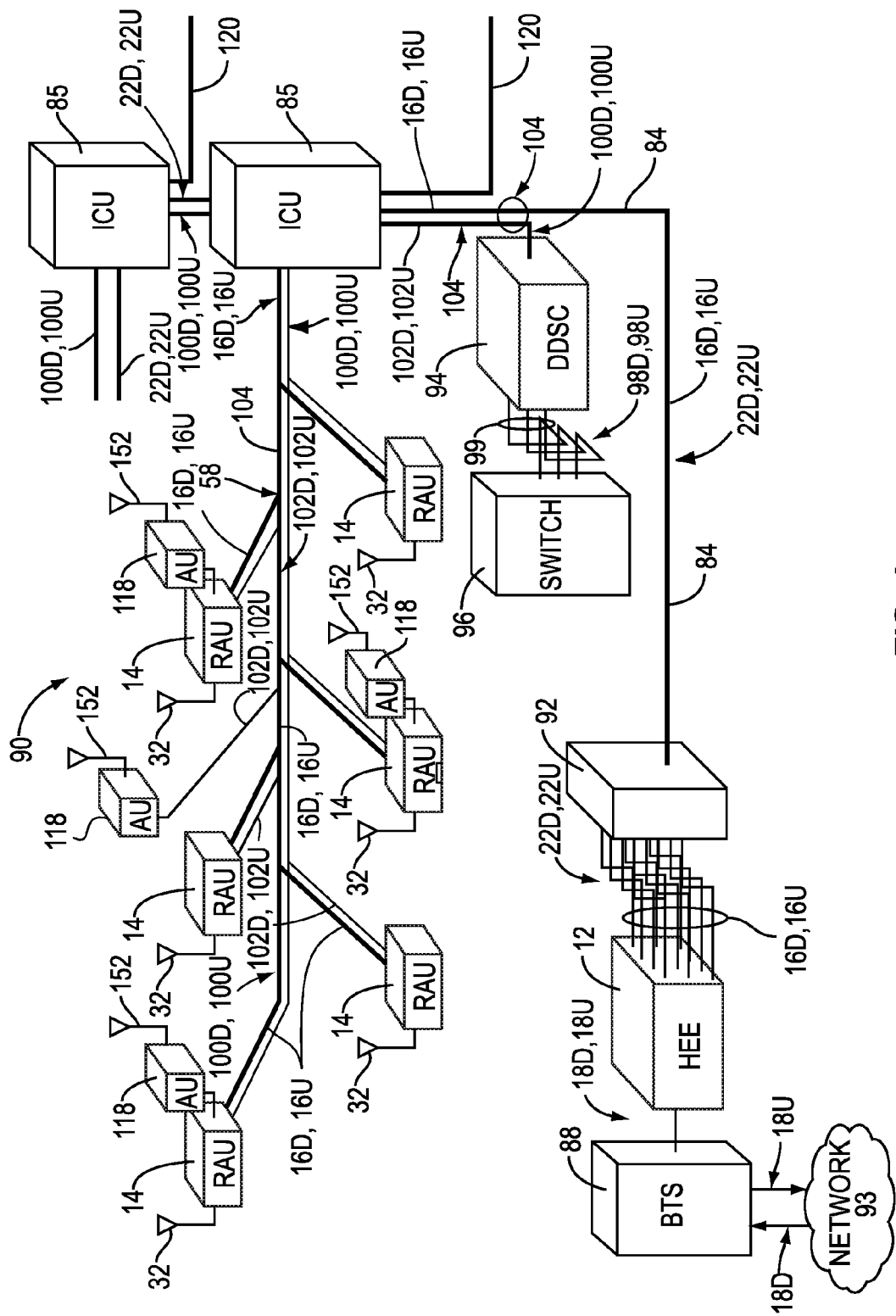
FIG. 4 is a schematic diagram of an exemplary embodiment of providing digital data services as electrical signals and radio frequency (RF) communication services over optical fiber to RAUs or other remote communications devices in an optical fiber-based distributed antenna system.

In this regard in one embodiment, FIG. 4 is a schematic diagram of an exemplary embodiment of providing digital data services over electrical signals and RF communication services over optical fiber to RAUs in a distributed antenna system 90. The distributed antenna system 90 includes some optical communication components provided in the optical fiber-based distributed antenna system 10 of FIGS. 1-3 in this embodiment. These common components are illustrated in FIG. 4 with common element numbers with FIGS. 1-3. As illustrated in FIG. 4, the HEE 12 is provided. The HEE 12 receives the downlink electrical RF signals 18D from the BTS 88. As previously discussed, the HEE 12 converts the downlink electrical RF signals 18D to downlink optical RF signals 22D to be distributed to the RAUs 14. The HEE 12 is also configured to convert the uplink optical RF signals 22U received from the RAUs 14 into uplink electrical RF signals 18U to be provided to the BTS 88 and on to a network 93 connected to the BTS 88. A patch panel 92 may be provided to receive the downlink and uplink optical fibers 16D, 16U configured to carry the downlink and uplink optical RF signals 22D, 22U. The downlink and uplink optical fibers 16D, 16U may be bundled together in one or more riser cables 84 and provided to one or more ICUs 85, as previously discussed and illustrated in FIG. 3.

To provide digital data services in the distributed antenna system 90 in this embodiment, a digital data service controller 94 (also referred to as "DDS controller" or "DDSC") is provided. The DDS controller 94 is a controller or other device configured to provide digital data services over a communications link, interface, or other communications channel or line, which may be either wired, wireless, or a combination of both. In this embodiment, the digital data services provided to the distributed antenna system 90 are provided from a DDS switch 96 in the form of electrical digital signals communicated over digital data services lines 99. In this embodiment, the DDS controller 94 does not contain a media converter since the electrical signals of the digital data services are not converted to optical signals in this embodiment. The DDS controller 94 may include a microprocessor, microcontroller, or dedicated circuitry. Alternatively, the DDS controller 94 may simply include a patch panel or module to allow digital data service connections from the DDS switch 96 to the DDS controller 94.

With continuing reference to FIG. 4, the DDS controller 94 in this embodiment is configured to provide downlink electrical digital signals (or downlink electrical digital data services signals) 98D from the DDS switch 96 over the data services lines 99 from the digital data services switch 96 into downlink electrical digital signals (or downlink electrical digital data services signals) 100D that can be communicated over a downlink electrical medium 102D to RAUs 14. In one embodiment, the downlink electrical medium 102D may be an electrical medium Ethernet cable, such as Category 5 (CAT5), Category 5e (CAT5e), Category 6 (CAT6), and Category 7 (CAT7) cable as non-limiting examples, which contains copper or other metal or metal alloy wire pairs. The DDS controller 94 is also configured to receive uplink electrical digital signals 100U from the RAUs 14 via the uplink electrical medium 102U. In this manner, the digital data services can be provided over the electrical medium 102D, 102U separate from the optical fibers 16D, 16U as part of the distributed antenna system 90 to provide digital data services in addition to RF communication services. In this regard as discussed below, client devices located at the RAUs 14 can access these digital data services and/or RF communication services depending on their configuration.

Providing digital data services over electrical medium may be particularly desirable or useful if the electrical medium is already present before the installation of the distributed antenna system. The distance of the electrical medium needs to be sufficient to support the required standards of the electrical digital signals. For example, Category X (CATx) electrical medium cable may be rated to support data transmission of approximately 1 Gbps up to 100 meters. If the distributed antenna system can support the distance limitations of the electrical medium, the distributed antenna system can employ the electrical medium to distribute digital data services as opposed to another medium, such as optical fiber for example. However, by providing optical fiber as the distribution medium for the RF communication services, enhanced services may be provided for RF communication services, including but not limited to increased distribution distances and bandwidths, low noise, and WDM, as examples.

Figure 5:
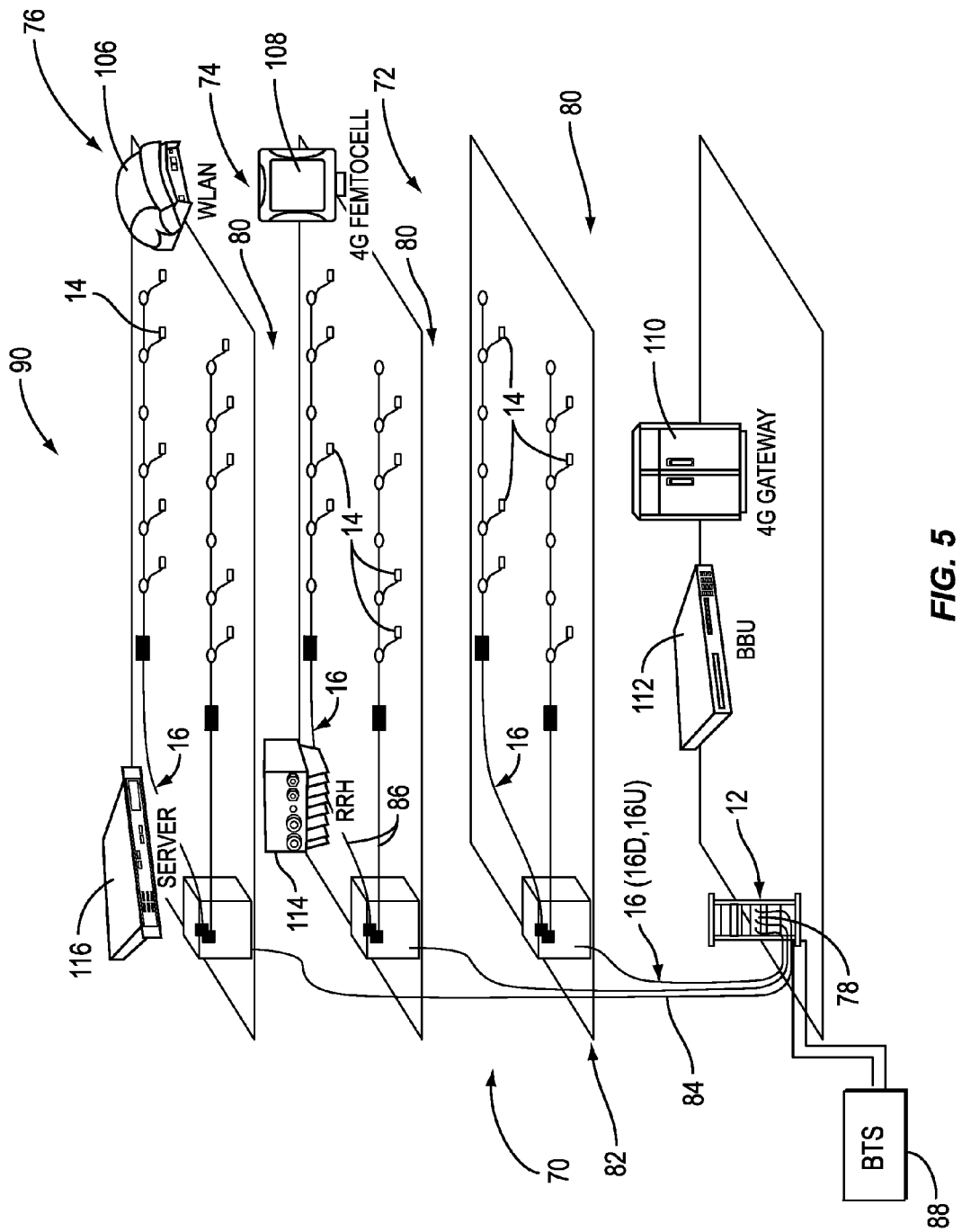
FIG. 5 is a schematic diagram of an exemplary building infrastructure in which digital data services and RF communication services are provided in an optical fiber-based distributed antenna system.

For example, FIG. 5 illustrates the building infrastructure 70 of FIG. 4, but with illustrative examples of digital data services and digital client devices that can be provided to client devices in addition to RF communication services in the distributed antenna system 90. As illustrated in FIG. 5, exemplary digital data services include WLAN 106, femtocells 108, gateways 110, baseband units (BBU) 112, remote radio heads (RRH) 114, and servers 116.

With reference back to FIG. 4, in this embodiment, the downlink and uplink electrical medium 102D, 102U are provided in a cable 104, which is interfaced to the ICU 85. The cable 104 may be an array cable or a home-run cable, as non-limiting examples. The ICU 85 is optional and provides a common point in this embodiment in which the downlink and uplink electrical medium 102D, 102U carrying electrical digital signals can be bundled with the downlink and uplink optical fibers 16U, 16D carrying RF optical signals, if desired. Alternatively, the cable 104 may not be bundled with or carry the downlink and uplink optical fibers 16U, 16D. One or more of the cables 104 can be provided containing the downlink and uplink optical fibers 16D, 16U for RF communication services and the downlink and uplink electrical medium 102D, 102U for digital data services to be routed and provided to the RAUs 14. Any combination of services or types of optical fibers can be provided in the cable 104. For example, the cable 104 may include single mode and/or multi-mode optical fibers for RF communication services and/or digital data services.

Examples of ICUs that may be provided in the distributed antenna system 90 to distribute both downlink and uplink optical fibers 16D, 16U for RF communication services and the downlink and uplink electrical medium 102D, 102U for digital data services are described in U.S. patent application Ser. No. 12/466,514 filed on May 15, 2009 and entitled "Power Distribution Devices, Systems, and Methods For Radio-Over-Fiber (RoF) Distributed Communication," and U.S. Provisional Patent Application No. 61/330,385, filed on May 2, 2010 and entitled "Power Distribution in Optical Fiber-based Distributed Communication Systems Providing Digital Data and Radio-Frequency (RF) Communication Services, and Related Components and Methods," both of which are incorporated herein by reference in their entireties.

With continuing reference to FIG. 4, some RAUs 14 can be connected to access units (AUs) 118 which may be access points (APs) or other devices supporting digital data services. The AUs 118 can also be connected directly to the HEE 12. AUs 118 are illustrated, but the AUs 118 could be any other device supporting digital data services. In the example of AUs, the AUs 118 provide access to the digital data services provided by the DDS switch 96. This is because the downlink and uplink electrical medium 102D, 102U carrying downlink and uplink electrical digital signals 100D, 100U from the DDS switch 96 and DDS controller 94 are provided to the AUs 118 via the cables 104 and the RAUs 14. Digital data client devices can access the AUs 118 to access digital data services provided through the DDS switch 96. An AU 118 may be considered another type of remote communications unit and may or may not include an antenna for wireless communications. If configured with an antenna, the AU 118 may be considered another type of remote antenna unit.

Remote communications devices, such as RAUs, AUs, and client devices coupled to same may require power to operate and to provide RF and/or digital data services. By providing digital data services over an electrical medium as part of a distributed antenna system, the electrical medium can also be used to distribute power to these remote communications devices. This may be a convenient method of providing power to remote digital data service clients as opposed to providing separate power sources locally at the remote clients or a separate medium for distributing power.

For example, power distributed to the RAUs 14 in FIG. 4, such as by or through the ICU 85 as an example, can also be used to provide power to the AUs 118 located at the RAUs 14 in the distributed antenna system 90. In this regard, the optional ICUs 85 may be configured to provide power for both the RAUs 14 and the AUs 118. A power supply may be located within the ICU 85, but could also be located outside of the ICU 85 and provided over an electrical power line 120, as illustrated in FIG. 4. As discussed in more detail below, the ICU 85 in this embodiment may be configured to distribute power on the same electrical medium as is used to distribute digital data services, for example, the downlink electrical medium 102D in FIG. 4. The ICU 85 may receive either alternating current (AC) or direct current (DC) power. The ICU 85 may receive 110 Volts (V) to 240V AC or DC power. The ICU 85 can be configured to produce any voltage and power level desired. The power level is based on the number of RAUs 14 and the expected loads to be supported by the RAUs 14 and any digital devices connected to the RAUs 14 in FIG. 4. It may further be desired to provide additional power management features in the ICU 85. For example, one or more voltage protection circuits may be provided.

Figure 6:
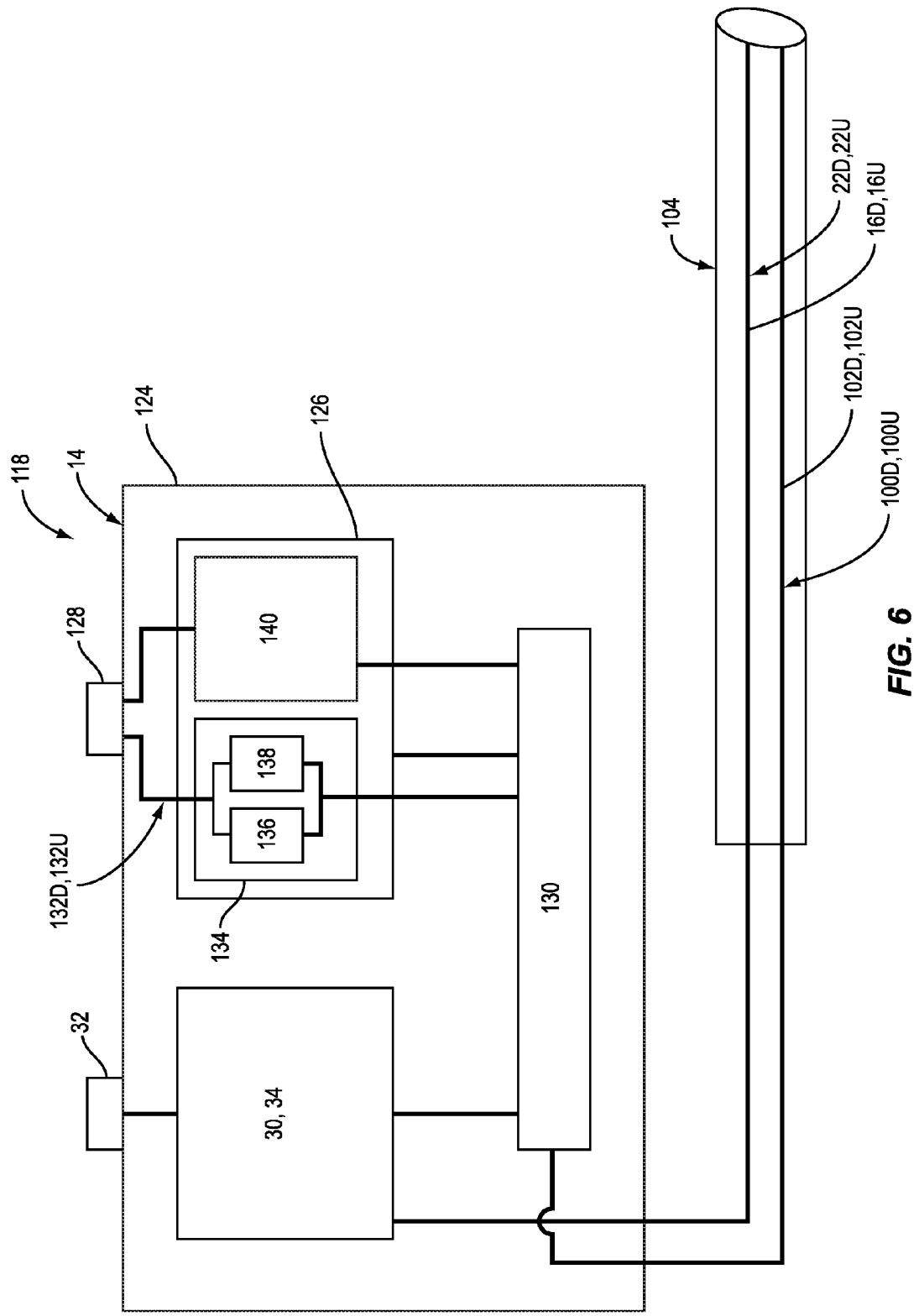
FIG. 6 is a schematic diagram of an exemplary RAU and/or access unit (AU) that can be employed in an optical fiber-based distributed antenna system providing exemplary digital data services and RF communication services.

FIG. 6 is a schematic diagram of exemplary internal components in the RAU 14 of FIG. 4 to further illustrate how the downlink and uplink optical fibers 16D, 16U for RF communications, the downlink and uplink electrical medium 102D, 102U for digital data services, and electrical power can be provided to the RAU 14 and can be distributed therein. As illustrated in FIG. 6, the cable 104 is illustrated that contains the downlink and uplink optical fibers 16D, 16U for RF communications, and the downlink and uplink electrical medium 102D, 102U for digital data services. As will be discussed in more detail below with regard to FIGS. 7 and 8, electrical power is also carried over the downlink and uplink electrical medium 102D, 102U from the ICU 85 or other component to provide power to the power-consuming components in the RAU 14. The power may be provided over the downlink and uplink electrical medium 102D, 102U at the ICU 85 or from another power supply or source at another location or component in the distributed antenna system 90. For example, the power supply used to provide power to the RAU 14 may be provided at the DDS controller 94 or DDS switch 96 in FIG. 4, as examples.

The downlink and uplink optical fibers 16D, 16U for RF communications, and the downlink and uplink electrical medium 102D, 102U for digital data services come into a housing 124 of the RAU 14. The downlink and uplink optical fibers 16D, 16U for RF communications are routed to the O/E converter 30 and E/O converter 34, respectively, and to the antenna 32, as also illustrated in FIG. 2 and previously discussed. The downlink and uplink electrical medium 102D, 102U for digital data services are routed to a digital data services interface 126 provided as part of the RAU 14 to provide access to digital data services via a port 128, which will be described in more detail below. The electrical power carried over the downlink and uplink electrical medium 102D, 102U provides power to the O/E converter 30 and E/O converter 34 and to the digital data services interface 126. In this regard, the downlink electrical medium 102D is coupled to a voltage controller 130 that regulates and provides the correct voltage to the O/E converter 30 and E/O converter 34 and to the digital data services interface 126 and other circuitry in the RAU 14.

In this embodiment, the digital data services interface 126 is configured to distribute the downlink electrical digital signals 100D on the downlink electrical medium 102D such that downlink electrical digital signals 132D can be accessed via the port 128. The digital data services interface 126 is also configured to distribute uplink electrical digital signals 132U received through the port 128 into uplink electrical digital signals 100U to be provided back to the DDS 94 (see FIG. 4). In this regard, a DDS controller 134 may be provided in the digital data services interface 126 to provide these distributions and control. The DDS controller 134 distributes the downlink electrical digital signals 100D on the downlink electrical medium 102D into downlink electrical digital signals 132D. Any signal processing of the downlink electrical digital signals 100D may be provided in a signal processor 136 before being distributed to the port 128. The DDS controller 134 also distributes the uplink electrical digital signals 132U received through the port 128 into uplink electrical digital signals 100U to be provided back to the DDS controller 94. Any signal processing of the uplink electrical digital signals communicated from digital clients connected to the port 128 may be provided in an optional signal processor 138 before being distributed on the downlink electrical medium 102D. In this regard, power from the downlink electrical medium 102D, via the voltage controller 130, provides power to any power-consuming components of the DDS controller 134.

Because electrical power is provided to the RAU 14 and the digital data services interface 126, this also provides an opportunity to provide power for digital devices connected to the RAU 14 via the port 128. In this regard, an optional power interface 140 is also provided in the digital data services interface 126 in this embodiment, as also illustrated in FIG. 6. The power interface 140 can be configured to receive power from the downlink electrical medium 102D, via the voltage controller 130, and to also make power accessible through the port 128. In this manner, if a client device contains a compatible connector to connect to the port 128, not only will digital data services be accessible, but power from the electrical power line 58 can also be accessed through the same port 128. Alternatively, the power interface 140 could be coupled to a separate port from the port 128 for digital data services.

For example, if the digital data services are provided over Ethernet, the power interface 140 could be provided as a Power-over-Ethernet (PoE) interface. The port 128 could be configured to receive an RJ-45 Ethernet connector compatible with PoE or PoE+ as an example. In this manner, an Ethernet connector connected into the port 128 would be able to access both Ethernet digital data services to and from the downlink and uplink electrical medium 102D, 102U to the DDS controller 94 as well as access power distributed by the ICU 85 over the cable 104 provided by the downlink electrical medium 102D.

Further, the HEE 12 could include low level control and management of the DDS controller 134 using communication supported by the HEE 12. For example, the DDS controller 134 could report functionality data (e.g., power on, reception of optical digital data, etc.) to the HEE 12 over the uplink optical fiber 16U that carries RF communication services as an example. The RAU 14 may include a microprocessor that communicates with the DDS controller 134 to receive this data and communicate this data over the uplink optical fiber 16U to the HEE 12.

Instead of providing a separate power line between the ICU 85 (or other device or other power supply) to the RAUs 14 and/or AUs 118, as discussed above, the electrical power supplied to the RAUs 14 and/or AUs 118 may be provided over the electrical medium 102D and/or 102U that is used to communicate the electrical digital signals 100D, 100U. The power supplied to the RAU 14 and AUs 118 can be used to provide power to power-consuming components used for RF communication services. The power supplied to the RAUs 14 and/or AUs 118 over the electrical medium 102D and/or 102U may also be used to power remote clients, such as PoE and PoE+ compliant devices as an example (also known as power sourcing equipment (PSE)), connected to the port 128 of the RAU 14 or AU 118 (see FIG. 6). In this manner, the RAUs 14 and/or AUs 118 may not require a local power source for power-consuming components provided within these devices and/or remote clients coupled to and receiving power from the RAUs 14 and/or AUs 118.

In this regard, the power provided to the RAUs 14 and/or AUs 118 may be added as direct current (DC) on the same medium, media, or lines carrying the electrical digital signals 100D, 100U (alternating current (AC) signals). Alternatively, the power may be provided over separate medium, media, or lines, such as separate twisted pair as an example, that do not carry the electrical digital signal 100D and/or 100U. Each of these scenarios may depend on the specific configuration of the electrical medium 102D, 102U and the standards and/or data rates configured or provided on the electrical medium 102D, 102U.

Figure 7:
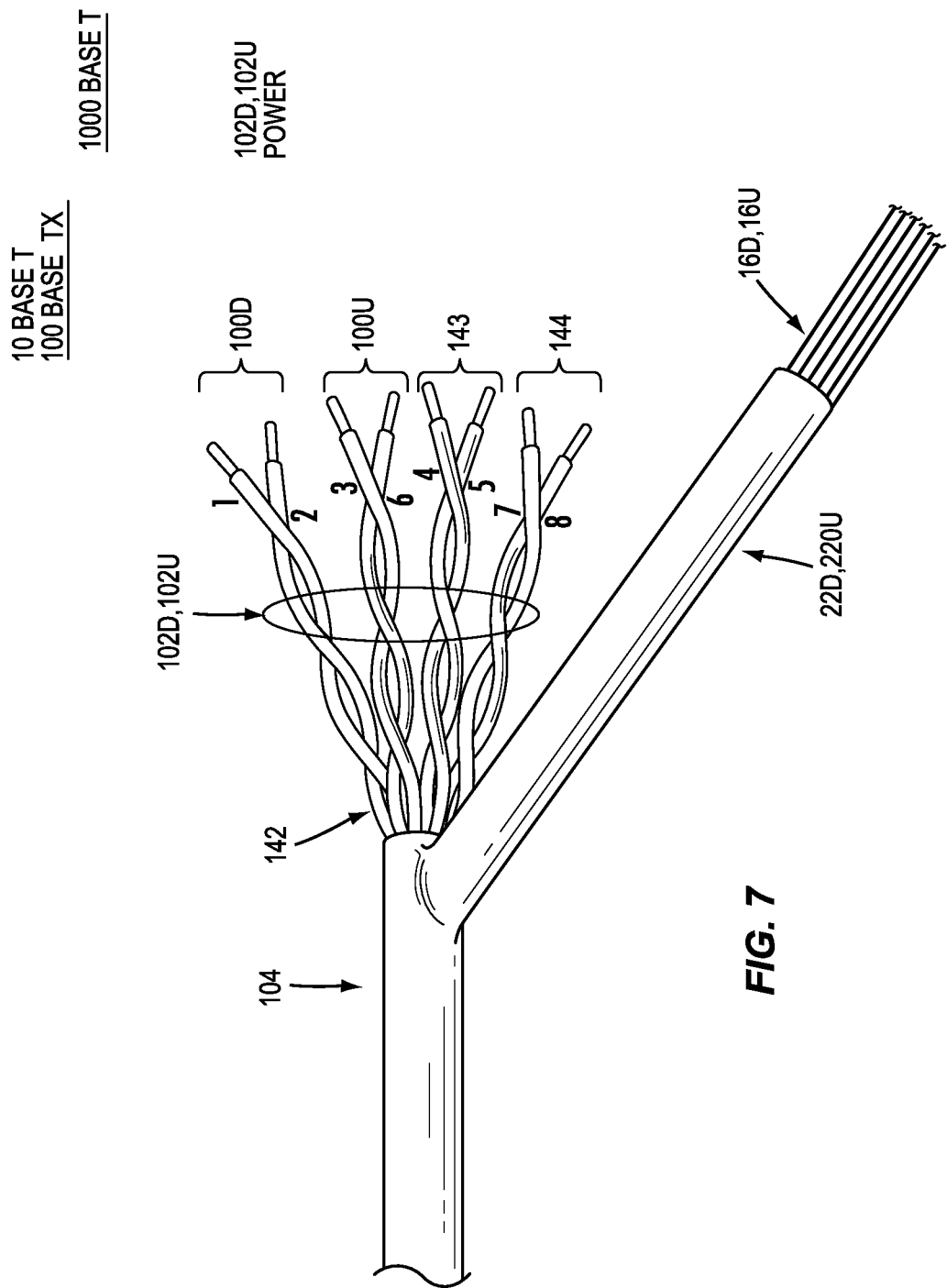
FIG. 7 is an exemplary schematic diagram of a cable containing optical fiber for distributing optical RF signals for RF communication services and an electrical medium for distribution electrical digital signals for digital data services and power to RAUs or other remote communications devices.

In this regard, FIG. 7 illustrates one embodiment of electrical medium 102D, 102U to provide both electrical digital signals 100D, 100U and to provide power to the RAUs 14 and/or APs 118. In this embodiment as discussed in more detail below, the electrical medium 102D, 102U is an Ethernet cable 142, particularly a CAT5/CAT6/CAT7 cable in this example. As illustrated in FIG. 7, the Ethernet cable 142 in this embodiment is contained within the cable 104 with the downlink and uplink optical fiber 16D, 16U. As previously discussed, the Ethernet cable 142 will carry electrical digital signals 100D, 100U for digital data services. The downlink and uplink optical fibers 16D, 16U will carry optical RF signals 22D, 22U for RF communication services. If the Ethernet cable 142 is configured for use with data rates of either 10 BASE T (10 Mbps), 100 BASE T (100 Mps), 1 Gps, or 10 Gps, at the DDS switch 96 (FIG. 4) as an example, pairs 1 and 2, and 3 and 6 carry electrical digital signals 100D, 100U as shown in FIG. 7. The other two pairs of the Ethernet cable 142, pairs 4 and 5, and 7 and 8 are unused electrical medium 143, 144 and are available for carrying power over electrical medium 143, 144 separately from the electrical digital signals 100D, 100U. This power can be provided on the unused electrical medium 143, 144 by the DDS switch 96, the DDS controller 94, the ICU 85, or at any other device or location that has access to power and/or a power supply.

Alternatively, as another example with continuing reference to FIG. 7, if the Ethernet cable 142 is configured for use with a data rate of 1000 BASE T (1 Gbps) at the DDS switch 96 (FIG. 4), all pairs are configured to carry electrical digital signals 100D, 100U. Power configured to be provided on the electrical medium 102D, 102U may be controlled according to the standard employed, for example, PoE according to IEEE 802.3af-2003 and PoE+ according to IEEE 802.3af-2003. Power can added to two (2) pairs of the twisted pairs (e.g., 1, 2, 3, and 6, or 4, 5, 7, and 8), or all pairs (e.g., 1, 2, 3, 6, 4, 5, 7, and 8) which carry the electrical digital signals 100D, 100U, such as for PoE compliance, as an example, as opposed to being provided separately from the electrical digital signals 100D, 100U. Providing power over only twisted pairs 1 and 2, and 3 and 6 is called "Mode A." Providing power over twisted pairs 4 and 5, and 7 and 8 is called "Mode B." IEEE802.3af-2003 may provide power using either Mode A or Mode B. IEEE802.at-2009 may provide power using Mode A, Mode B, or Mode A and Mode B concurrently. However, it may be unknown to equipment in the distributed antenna system 90 which pair combinations of the twisted pairs carry power. It may be preferable that this configuration be transparent to the distributed antenna system 90 to avoid configuration issues. Further, it may also be desired to provide additional power over the electrical medium 102D, 102U for RF communication services components, such as converters. But, not knowing which pairs of the twisted pairs of the Ethernet cable 142 that carry power for PoE complaint devices is problematic. This is because it will not be known which of the pairs are available for providing separate power from a separate power source on the RF communication services.

Figure 8:
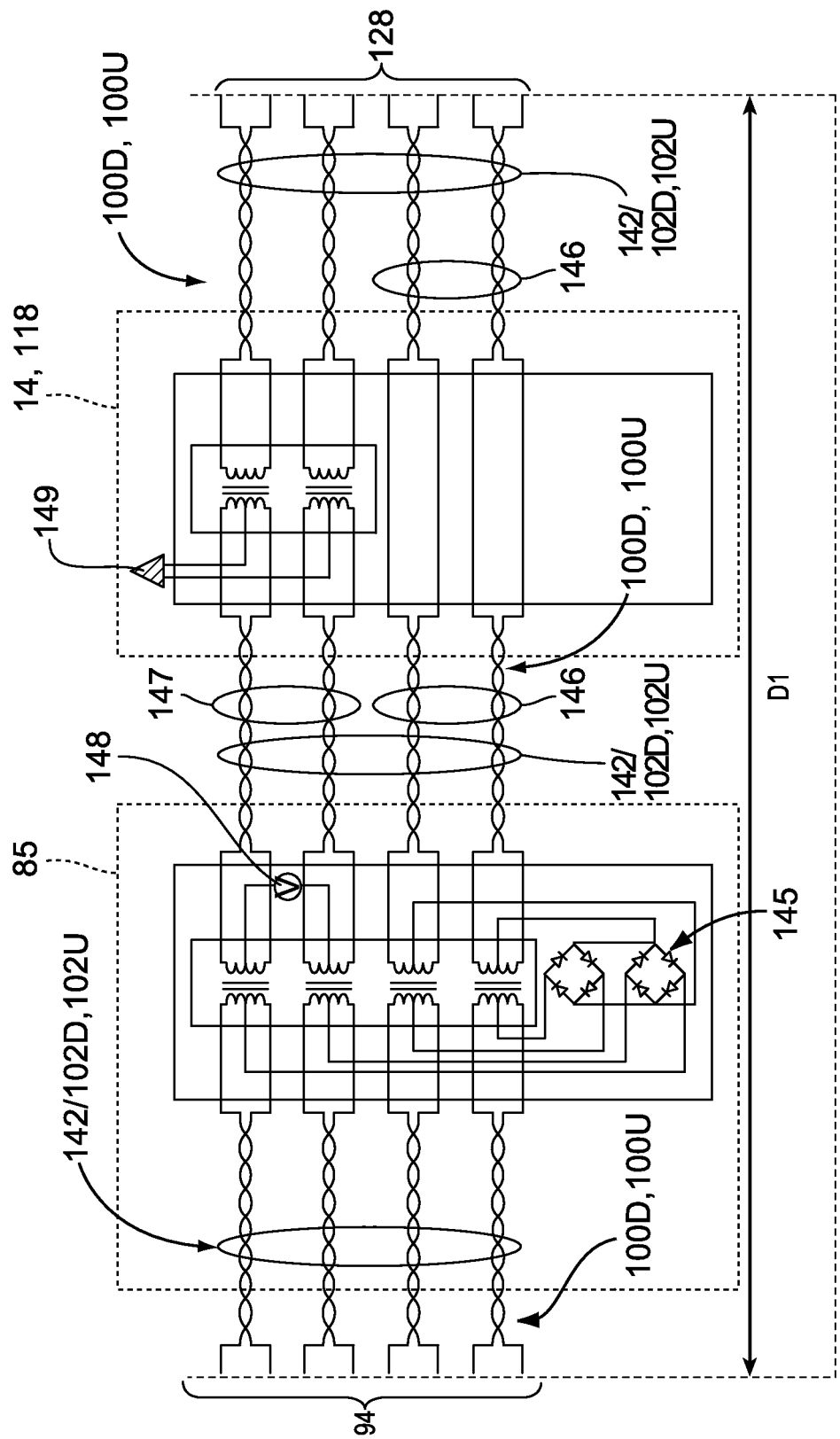
FIG. 8 is an exemplary schematic diagram of distributing digital data services and power carried over an electrical medium carrying digital signals for providing power to RAUs or other remote communications devices.

In order to also have the ability to provide power from the ICU 85 or other power source over the electrical medium 102D, 102U to the RF communication service components in the RAUs 14 and/or AUs 118, power provided on the electrical medium 102D, 102U for powering digital client devices connected to the port 128 (e.g., PoE) is directed to be exclusively carried by the same two pairs of twisted pairs of the Ethernet cable 142, as illustrated in FIG. 8. In this manner, the other two pairs of twisted pairs of the Ethernet cable 142 are available to carry power for the RF communication services power-consuming components. Otherwise, it may not be possible to provide sufficient power for the RF communication services and digital data clients connected to the port 128 if power for both is placed on only one (1) pair of the twisted pairs of electrical medium 102D, 102U. For example, it may be desired to provide thirty (30) Watts (W) of power to the port 128 and sixty (60) W of power to the RAU 14 and/or AU 118 for components used to provide RF communication services. It may not be possible to provide ninety (90) W of power on only one (1) pair of the twisted pairs of electrical medium 102D, 102U.

Turning to FIG. 8, the electrical medium 102D, 102U (sometimes referred to herein as electrical input links) are provided as coming from the DDS controller 94 (FIG. 4). The electrical medium 102D, 102U carried to the RAUs 14 and/or AUs 118 to provide digital data services via electrical digital signals 100D, 100U as previously described, and may optionally also have power signals conveyed thereon. Digital data services clients can be connected to the port 128 as illustrated in FIG. 8 to receive digital data services. Also, digital data services clients can receive digital data services wirelessly, as previously discussed. The digital data services provided via the electrical digital signals 100D, 100U are provided to the RAU 14 and/or AU 118 transparent of any power signals carried on the electrical medium 102D, 102U.

With continuing reference to FIG. 8, circuitry, and in particular, diode bridge circuits 145 are provided in the ICU 85 in this embodiment, which are coupled to each of the twisted pairs of the electrical medium 102D, 102U as illustrated in FIG. 8. The diode bridge circuits 145 compensate for polarity shifts in power placed on any of the twisted pairs of the electrical medium 102D, 102U from the DDS controller 94, and direct such power exclusively to a lower two pair 146 of the electrical medium 102D, 102U. In this regard, the lower two pairs 146 form an electrical power output, in this case, outputs for the ICU 85. Thus, the diode bridge circuits 145 couple the electrical input link of the electrical medium 102D, 102U to at least one electrical power output in the form of one or two of the lower two pairs 146. Polarity may be undefined and thus a receiver may need to be able to accept the polarity in either mode. In this manner, upper two pairs 147 of the electrical medium 102D, 102U do not carry power from the DDS controller 94. In this regard, the upper two pairs 147 form electrical communications outputs, in this case, outputs for the ICU 85, and are configured to distribute the digital data signals to the RAU 14, and in particular to a communications interface of the RAU 14. The upper two pairs 147 of the electrical medium 102D, 102U are available to carry additional power, if desired, from a separate power source 148 to be directed onto the upper two pairs 147 of the electrical medium 102D, 102U. This additional power can be used to provide power for RF power-consuming components in the RAU 14 and/or AU 118. A power tap 149 may be provided in the RAU 14 and/or AU 118 to tap power from the upper twisted pairs 147 of the electrical medium 102D, 102U for providing power to the RF communication services components, while power can be separately provided over the lower twisted pairs 146 of the electrical medium 102D, 102U to the port 128 for digital data clients to be powered.

Figure 9:
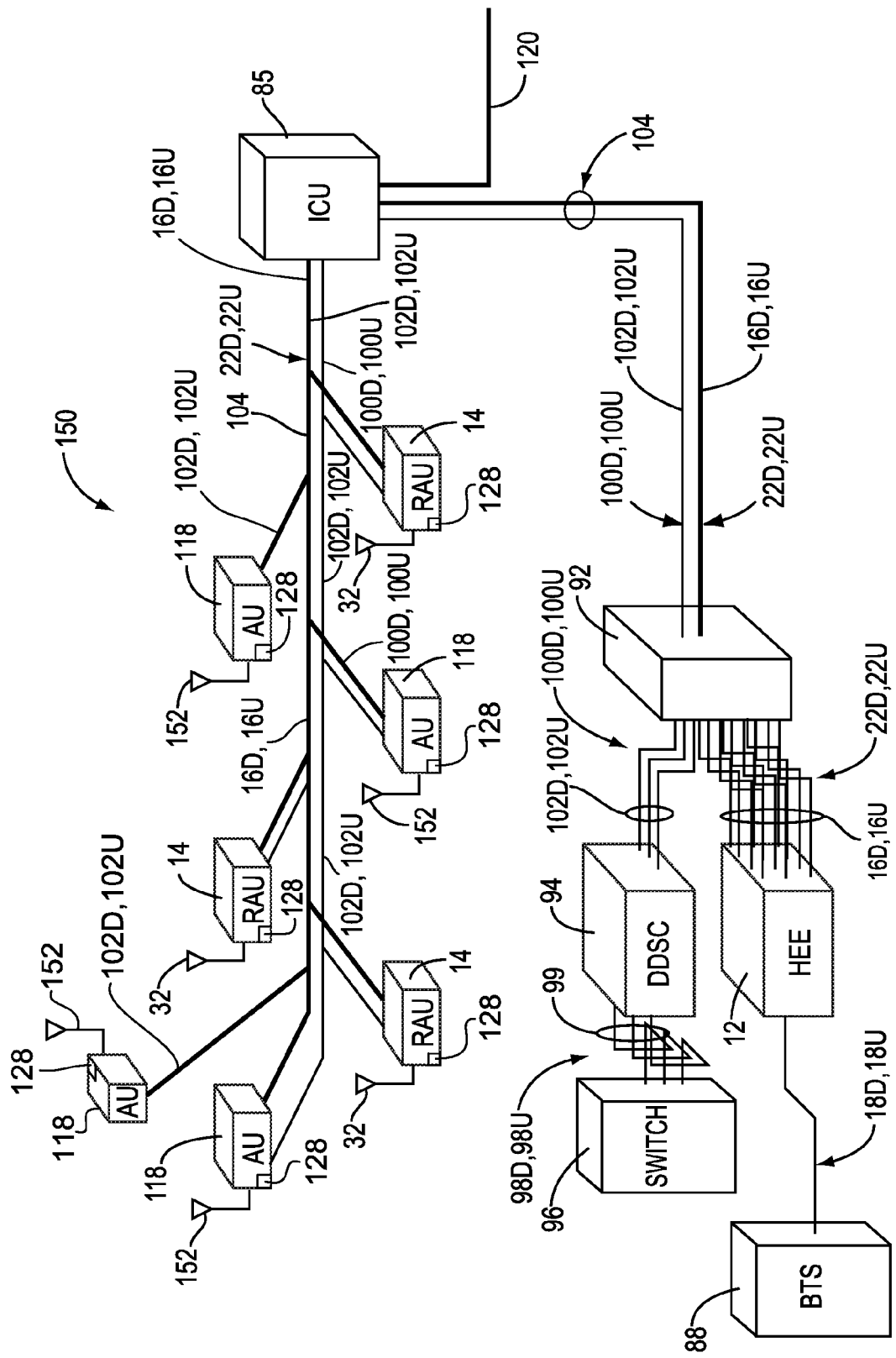
FIG. 9 is a schematic diagram of another exemplary embodiment of digital data services as electrical signals and RF communication services over optical fiber to RAUs or other remote communications devices in an optical fiber-based distributed antenna system.

Other configurations are possible to provide digital data services and distribute power for same in a distributed antenna system. For example, FIG. 9 is a schematic diagram of another exemplary embodiment of providing digital data services in a distributed antenna system also configured to provide RF communication services. In this regard, FIG. 9 provides a distributed antenna system 150. The distributed antenna system 150 may be similar to and include common components provided in the distributed antenna system 90 in FIG. 4. In this embodiment, instead of the DDS controller 94 being provided separate from the HEE 12, the DDS controller 94 is co-located with the HEE 12. The downlink and uplink electrical medium 102D, 102U for distributing digital data services from the DDS switch 96 are also connected to the patch panel 92. The downlink and uplink optical fibers 16D, 16U for RF communications and the downlink and uplink electrical medium 102D, 102U for digital data services are then routed to the ICU 85, similar to FIG. 2.

The downlink and uplink optical fibers 16D, 16U for RF communications, and the downlink and uplink electrical medium 102D, 102U for digital data services, may be provided in a common cable, such as the cable 104, or provided in separate cables. Further, as illustrated in FIG. 9, standalone access units (AUs) 118 may be provided separately from the RAUs 14 in lieu of being integrated with the RAUs 14, as illustrated in FIG. 4. The standalone AUs 118 can be configured to contain the DDS controller 134 in FIG. 6. The AUs 118 may also each include antennas 152 (also shown in FIG. 4) to provide wireless digital data services in lieu of or in addition to wired services through the port 128 through the RAUs 14.

Figure 10:
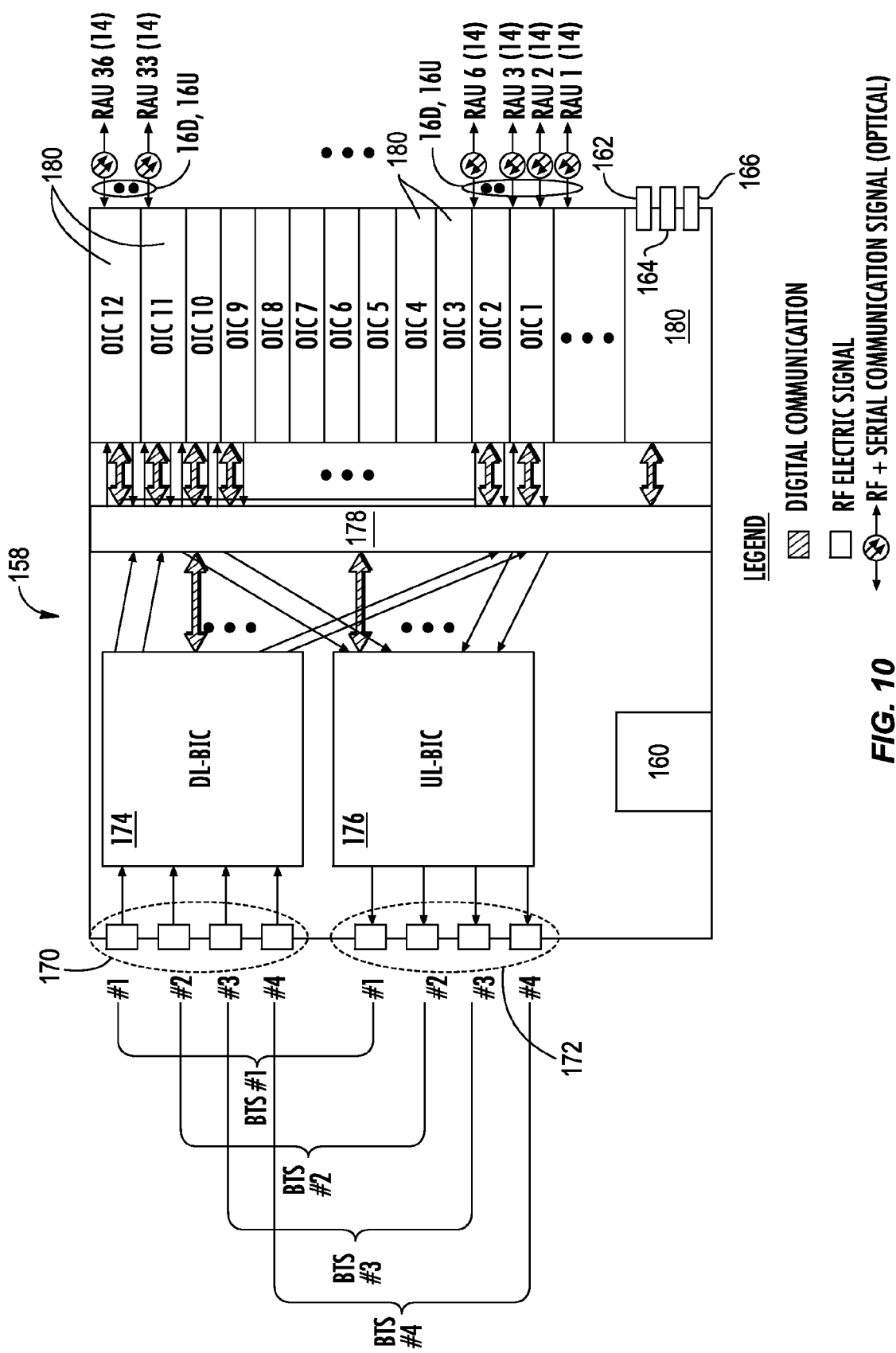
FIG. 10 is a schematic diagram of exemplary head-end equipment to provide RF communication services over optical fiber to RAUs or other remote communications devices in an optical fiber-based distributed antenna system.

The distributed antenna systems disclosed and contemplated herein are not limited to any particular type of distributed antenna system or particular equipment. For example, FIG. 10 is a schematic diagram of exemplary HEE 158 that may be employed with any of the distributed antenna systems disclosed herein, including but not limited to the distributed antenna systems 10, 90, 150. The HEE 158 in this embodiment is configured to distribute RF communication services over optical fiber. In this embodiment as illustrated in FIG. 10, the HEE 158 includes a head-end controller (HEC) 160 that manages the functions of the HEE 158 components and communicates with external devices via interfaces, such as an RS-232 port 162, a Universal Serial Bus (USB) port 164, and an Ethernet port 168, as examples. The HEE 158 can be connected to a plurality of BTSs, transceivers, and the like via BTS inputs 170 and BTS outputs 172. The BTS inputs 170 are downlink connections and the BTS outputs 172 are uplink connections. Each BTS input 170 is connected to a downlink BTS interface card (BIC) 174 located in the HEE 158, and each BTS output 172 is connected to an uplink BIC 176 also located in the HEE 158. The downlink BIC 174 is configured to receive incoming or downlink RF signals from the BTS inputs 170 and split the downlink RF signals into copies to be communicated to the RAUs 14, as illustrated in FIG. 2. The uplink BIC 176 is configured to receive the combined outgoing or uplink RF signals from the RAUs 14 and split the uplink RF signals into individual BTS inputs 172 as a return communication path.

With continuing reference to FIG. 10, the downlink BIC 174 is connected to a midplane interface card 178 panel in this embodiment. The uplink BIC 176 is also connected to the midplane interface card 178. The downlink BIC 174 and uplink BIC 176 can be provided in printed circuit boards (PCBs) that include connectors that can plug directly into the midplane interface card 178. The midplane interface card 178 is in electrical communication with a plurality of optical interface cards (OICs) 180, which provide an optical to electrical communication interface and vice versa between the RAUs 14 via the downlink and uplink optical fibers 16D, 16U and the downlink BIC 174 and uplink BIC 176. The OICs 180 include the E/O converter 28 like discussed with regard to FIG. 1 that converts electrical RF signals from the downlink BIC 174 to optical RF signals, which are then communicated over the downlink optical fibers 16D to the RAUs 14 and then to client devices. The OICs 180 also include the O/E converter 36 like in FIG. 1 that converts optical RF signals communicated from the RAUs 14 over the uplink optical fibers 16U to the HEE 158 and then to the BTS outputs 172.

With continuing reference to FIG. 10, the OICs 180 in this embodiment support up to three (3) RAUs 14 each. The OICs 180 can also be provided in a PCB that includes a connector that can plug directly into the midplane interface card 178 to couple the links in the OICs 180 to the midplane interface card 178. The OICs 180 may consist of one or multiple optical interface cards (OICs). In this manner, the HEE 158 is scalable to support up to thirty-six (36) RAUs 14 in this embodiment since the HEE 158 can support up to twelve (12) OICs 180. If less than thirty-six (36) RAUs 14 are to be supported by the HEE 158, less than twelve (12) OICs 180 can be included in the HEE 158 and plugged into the midplane interface card 178. One OIC 180 is provided for every three (3) RAUs 14 supported by the HEE 158 in this embodiment. OICs 180 can also be added to the HEE 158 and connected to the midplane interface card 178 if additional RAUs 14 are desired to be supported beyond an initial configuration. With continuing reference to FIG. 10, the HEU 160 can also be provided that is configured to be able to communicate with the downlink BIC 174, the uplink BIC 176, and the OICs 180 to provide various functions, including configurations of amplifiers and attenuators provided therein.

Figure 11:
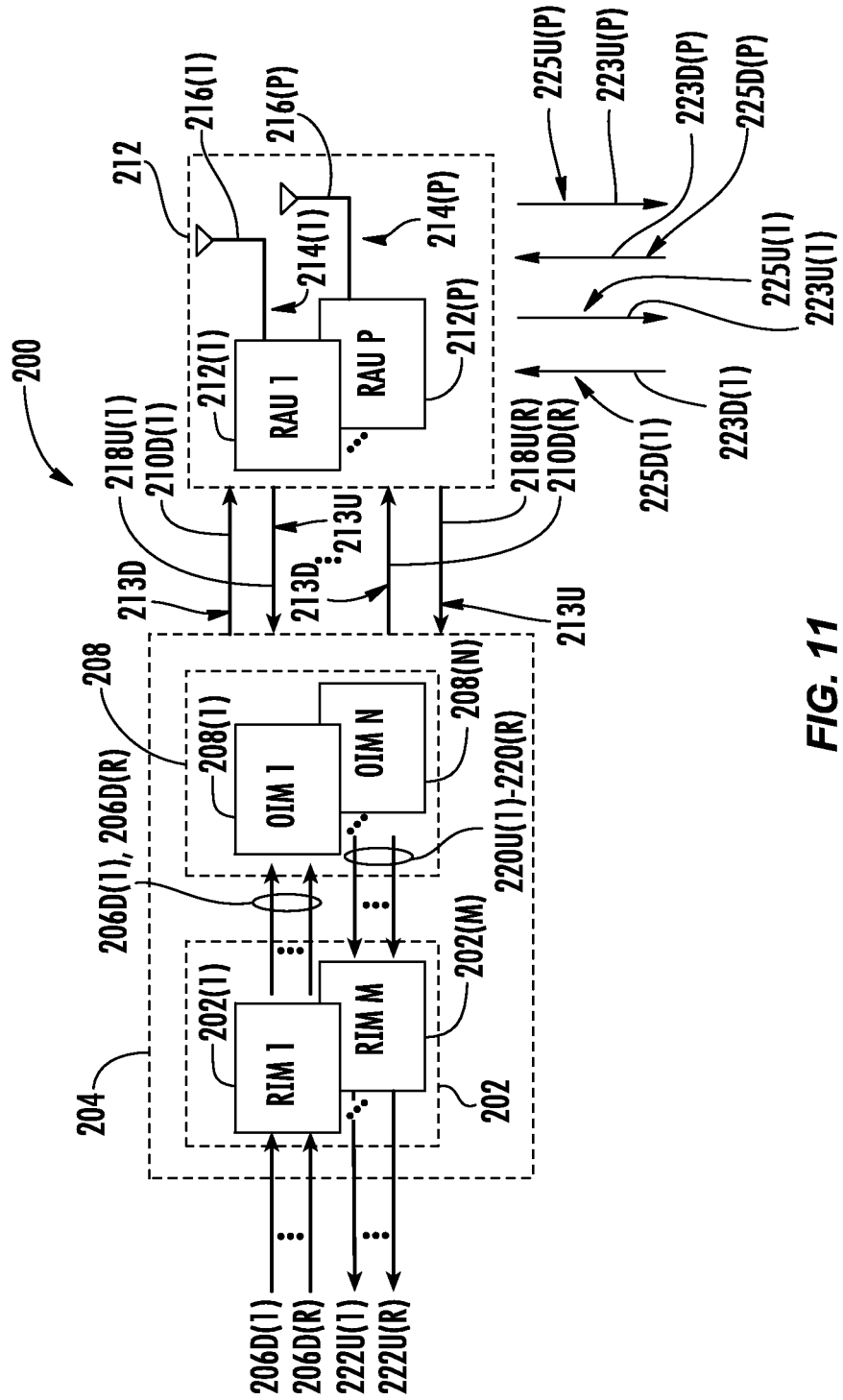
FIG. 11 is a schematic diagram of an exemplary distributed antenna system with alternative equipment to provide RF communication services over optical fiber and digital data services as electrical signals to RAUs or other remote communications devices in an optical fiber-based distributed antenna system.

FIG. 11 is a schematic diagram of another exemplary distributed antenna system 200 that may be employed according to the embodiments disclosed herein to provide RF communication services and digital data services. In this embodiment, the distributed antenna system 200 includes optical fiber for distributing RF communication services. The distributed antenna system 200 also includes an electrical medium for distributing digital data services.

With continuing reference to FIG. 11, the distributed antenna system 200 in this embodiment is comprised of three (3) main components. One or more radio interfaces provided in the form of radio interface modules (RIMs) 202(1)-202(M) in this embodiment are provided in HEE 204 to receive and process downlink electrical RF communication signals 206D (1)-206D(R) prior to optical conversion into downlink optical RF communication signals. The processing of the downlink electrical RF communication signals 206D(1)-206D(R) can include any of the processing previously described above in the HEE 12 in FIGS. 1-3. The notations "1-R" and "1-M" indicate that any number of the referenced component, 1-R and 1-M, respectively, may be provided. As will be described in more detail below, the HEE 204 is configured to accept a plurality of RIMs 202(1)-202(M) as modular components that can easily be installed and removed or replaced in the HEE 204. In one embodiment, the HEE 204 is configured to support up to four (4) RIMs 202(1)-202(M) as an example.

Each RIM 202(1)-202(M) can be designed to support a particular type of radio source or range of radio sources (i.e., frequencies) to provide flexibility in configuring the HEE 204 and the distributed antenna system 200 to support the desired radio sources. For example, one RIM 202 may be configured to support the Personal Communication Services (PCS) radio band. Another RIM 202 may be configured to support the 700 MHz radio band. In this example, by inclusion of these RIMs 202, the HEE 204 would be configured to support and distribute RF communication signals on both PCS and LTE 700 radio bands. RIMs 202 may be provided in HEE 204 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). RIMs 202 may be provided in HEE 204 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

RIMs 202 may be provided in HEE 204 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

The downlink electrical RF communication signals 206D (1)-206D(R) are provided to a plurality of optical interfaces provided in the form of optical interface modules (OIMs) 208(1)-208(N) in this embodiment to convert the downlink electrical RF communication signals 206D(1)-206D(N) into downlink optical RF signals 210D(1)-210D(R). The notation "1-N" indicates that any number of the referenced component 1-N may be provided. The OIMs 208 may be configured to provide one or more optical interface components (OICs) that contain O/E and E/O converters, as will be described in more detail below. The OIMs 208 support the radio bands that can be provided by the RIMs 202, including the examples previously described above. Thus, in this embodiment, the OIMs 208 may support a radio band range from 400 MHz to 2700 MHz, as an example, so providing different types or models of OIMs 208 for narrower radio bands to support possibilities for different radio band-supported RIMs 202 provided in HEE 204 is not required. Further, as an example, the OIMs 208 may be optimized for sub-bands within the 400 MHz to 2700 MHz frequency range, such as 400-700 MHz, 700 MHz-1 GHz, 1 GHz-1.6 GHz, and 1.6 GHz-2.7 GHz, as examples.

The OIMs 208(1)-208(N) each include E/O converters to convert the downlink electrical RF communication signals 206D(1)-206D(R) to downlink optical RF signals 210D(1)-210D(R). The downlink optical RF signals 210D(1)-210D(R) are communicated over downlink optical fiber(s) 213D to a plurality of RAUs 212(1)-212(P). The notation "1-P" indicates that any number of the referenced component 1-P may be provided. O/E converters provided in the RAUs 212(1)-212(P) convert the downlink optical RF signals 210D(1)-210D(R) back into downlink electrical RF communication signals 206D(1)-206D(R), which are provided over downlinks 214(1)-214(P) coupled to antennas 216(1)-216(P) in the RAUs 212(1)-212(P) to client devices in the reception range of the antennas 216(1)-216(P).

Figure 12:
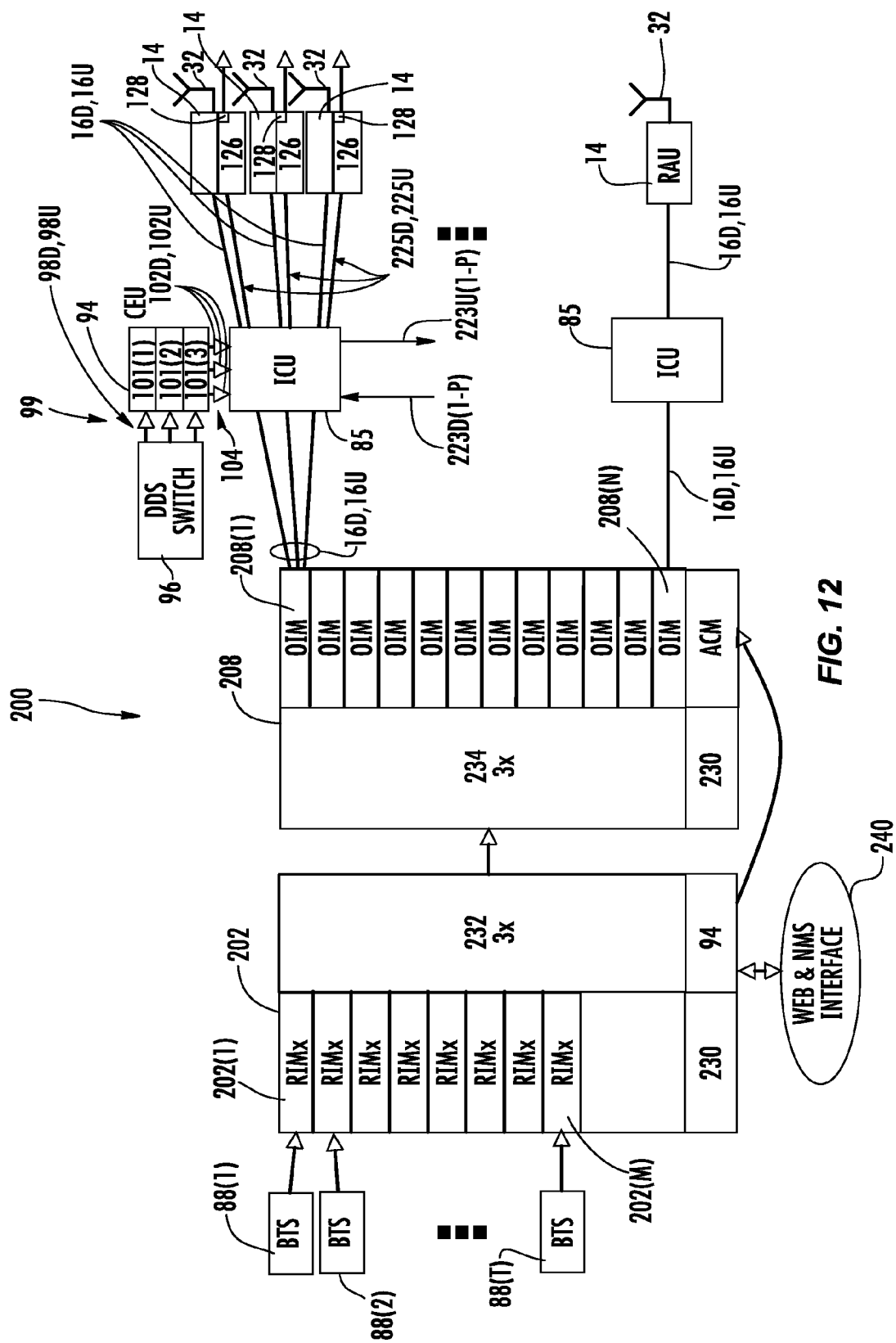
FIG. 12 is a schematic diagram of providing digital data services as electrical signals and RF communication services over optical fiber to RAUs or other remote communications devices in the optical fiber-based distributed antenna system of FIG. 11.

E/O converters are also provided in the RAUs 212(1)-212 (P) to convert uplink electrical RF communication signals 206U(1)-206U(R) received from client devices through the antennas 216(1)-216(P) into uplink optical RF signals 210U (1)-210U(R) to be communicated over uplink optical fibers 213U to the OIMs 208(1)-208(N). The OIMs 208(1)-208(N) include O/E converters that convert the uplink optical signals 210U(1)-210U(R) into uplink electrical RF communication signals 220U(1)-220U(R) that are processed by the RIMs 202(1)-202(M) and provided as uplink electrical RF communication signals 222U(1)-222U(R). Downlink electrical digital signals 223D(1)-223D(P) communicated over downlink electrical medium 225D(1)-225D(P) are provided to the RAUs 212(1)-212(P), such as from a DDS controller and/or DDS switch as provided by example in FIG. 4, separately from the RF communication services, as well as uplink electrical digital signals 223U(1)-223U(P) communicated over uplink electrical medium 225U(1)-225U(P), as also illustrated in FIG. 12. Common elements between FIG. 12 and FIG. 4 are illustrated in FIG. 12 with common element numbers. Power may be provided in the downlink and/or uplink electrical medium 225D(1)-225D(P) and/or 225U(1)-225U(P) is provided to the RAUs 212(1)-212(P).

FIG. 12 is a schematic diagram of providing digital data services and RF communication services to RAUs and/or other remote communications units in the distributed antenna system 200 of FIG. 11. Common components between FIGS. 11 and 12 and other figures provided have the same element numbers and thus will not be re-described. As illustrated in FIG. 12, a power supply module (PSM) 230 may be provided to provide power to the RIMs 202(1)-222(M) and radio distribution cards (RDCs) 232 that distribute the RF communications from the RIMs 202(1)-202(M) to the OIMs 208(1)-208(N) through RDCs 234. A PSM 236 may be provided to provide power to the OIMs 208(1)-208(N). An interface 240, which may include web and network management system (NMC) interfaces, may also be provided to allow configuration and communication to the RIMs 202(1)-202(M) and other components of the distributed antenna system 200.

Figure 13:
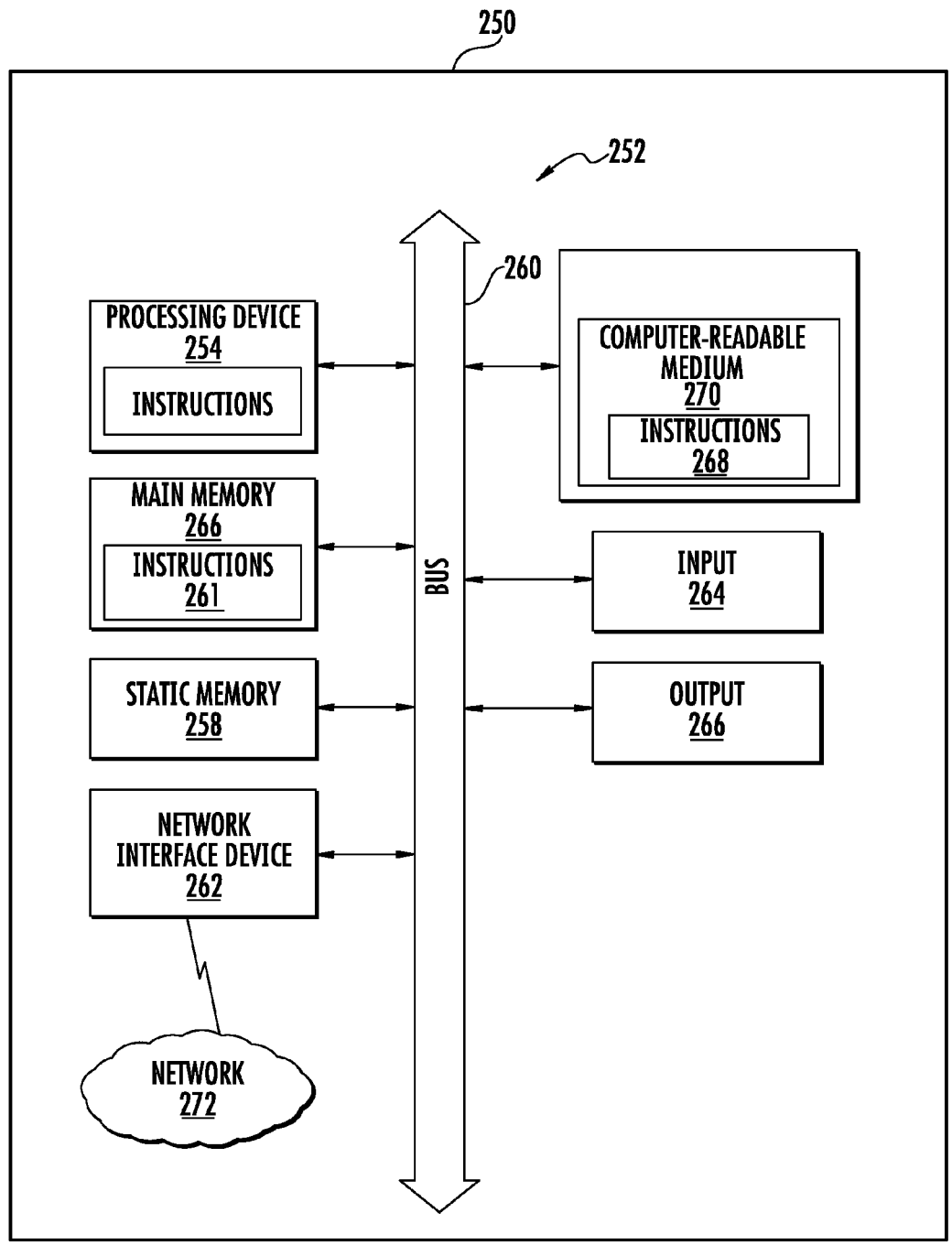
FIG. 13 is a schematic diagram of a generalized representation of an exemplary computer system that can be included in any of the modules provided in the exemplary distributed antenna systems and/or their components described herein, wherein the exemplary computer system is adapted to execute instructions from an exemplary computer-readable medium.

FIG. 13 is a schematic diagram representation of an exemplary electronic device 250 in the exemplary form of an exemplary computer system 252 adapted to execute instructions from an exemplary computer-readable medium to perform power management functions. The electronic device 250 may be included in the HEE, a DDS controller, an RAU, or an AU, but could be any other module or device provided in the distributed antenna systems described herein. In this regard, the electronic device 250 may comprise the computer system 252 within which a set of instructions for causing the electronic device 250 to perform any one or more of the methodologies discussed herein may be executed. The electronic device 250 may be connected (e.g., networked) to other machines in a LAN, an intranet, an extranet, or the Internet. The electronic device 250 may operate in a client-server network environment, or as a peer machine in a peer-to-peer (or distributed) network environment. While only a single device is illustrated, the term "device" shall also be taken to include any collection of devices that individually or jointly execute a set (or multiple sets) of instructions to perform any one or more of the methodologies discussed herein. The electronic device 250 may be a circuit or circuits included in an electronic board card, such as a printed circuit board (PCB) as an example, a server, a personal computer, a desktop computer, a laptop computer, a personal digital assistant (PDA), a computing pad, a mobile device, or any other device, and may represent, for example, a server or a user's computer.

The exemplary computer system 252 includes a processing device or processor 254, a main memory 256 (e.g., read-only memory (ROM), flash memory, dynamic random access memory (DRAM) such as synchronous DRAM (SDRAM), etc.), and a static memory 258 (e.g., flash memory, static random access memory (SRAM), etc.), which may communicate with each other via a bus 260. Alternatively, the processing device 254 may be connected to the main memory 256 and/or static memory 258 directly or via some other connectivity means. The processing device 254 may be a controller, and the main memory 256 or static memory 258 may be any type of memory, each of which can be included in HEE 12, 158, the DDS controller 94, RAUs 14, and/or AUs 118.

The processing device 254 represents one or more general-purpose processing devices such as a microprocessor, central processing unit, or the like. More particularly, the processing device 254 may be a complex instruction set computing (CISC) microprocessor, a reduced instruction set computing (RISC) microprocessor, a very long instruction word (VLIW) microprocessor, a processor implementing other instruction sets, or processors implementing a combination of instruction sets. The processing device 254 is configured to execute processing logic in instructions 261 for performing the operations and steps discussed herein.

The computer system 252 may further include a network interface device 262. The computer system 252 also may or may not include an input 264 to receive input and selections to be communicated to the computer system 252 when executing instructions. The computer system 252 also may or may not include an output 266, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 252 may or may not include a data storage device that includes instructions 268 stored in a computer-readable medium 270 embodying any one or more of the RAU power management methodologies or functions described herein. The instructions 268 may also reside, completely or at least partially, within the main memory 256 and/or within the processing device 254 during execution thereof by the computer system 252, the main memory 256 and the processing device 254 also constituting computer-readable media. The instructions 258 may further be transmitted or received over a network 272 via the network interface device 262.

While the computer-readable medium 270 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical and magnetic media, and carrier wave signals.

The embodiments disclosed herein include various steps. The steps of the embodiments disclosed herein may be performed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes a machine-readable storage medium (e.g., read only memory ("ROM"), random access memory ("RAM"), magnetic disk storage media, optical storage media, flash memory devices, etc.), a machine-readable transmission medium (electrical, optical, acoustical or other form of propagated signals (e.g., carrier waves, infrared signals, digital signals, etc.)), etc.

Unless specifically stated otherwise as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art would further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A controller may be a processor. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The embodiments disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. It is to be understood that the operational steps illustrated in the flow chart diagrams may be subject to numerous different modifications as will be readily apparent to one of skill in the art. Those of skill in the art would also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, as used herein, it is intended that terms "fiber optic cables" and/or "optical fibers" include all types of single mode and multi-mode light waveguides, including one or more optical fibers that may be upcoated, colored, buffered, ribbonized and/or have other organizing or protective structure in a cable such as one or more tubes, strength members, jackets or the like. The optical fibers disclosed herein can be single mode or multi-mode optical fibers. Likewise, other types of suitable optical fibers include bend-insensitive optical fibers, or any other expedient of a medium for transmitting light signals. An example of a bend-insensitive, or bend resistant, optical fiber is ClearCurve® Multimode fiber commercially available from Corning Incorporated. Suitable fibers of this type are disclosed, for example, in U.S. Patent Application Publication Nos. 2008/0166094 and 2009/0169163, the disclosures of which are incorporated herein by reference in their entireties.

Many modifications and other embodiments of the embodiments set forth herein will come to mind to one skilled in the art to which the embodiments pertain having the benefit of the teachings presented in the foregoing descriptions and the associated drawings. Therefore, it is to be understood that the description and claims are not to be limited to the specific embodiments disclosed and that modifications and other embodiments are intended to be included within the scope of the appended claims. It is intended that the embodiments cover the modifications and variations of the embodiments provided they come within the scope of the appended claims and their equivalents. Although specific terms are employed herein, they are used in a generic and descriptive sense only and not for purposes of limitation.

We claim:

1. A power unit for distributing power in a distributed antenna system, comprising:
   an electrical input medium comprising a plurality of electrical input links each configured to convey digital data signals and power signals;
   an electrical output medium comprising a plurality of electrical output links comprising an upper set of electrical output links and a lower set of electrical output links, wherein:
      the upper set of electrical output links and the lower set of electrical output links comprise at least one electrical communications output configured to distribute the digital data signals from the plurality of electrical input links to at least one communications interface;
      the lower set of electrical output links comprise at least one electrical power output configured to distribute the power signals to at least one power interface; and
   a circuit configured to:
      receive the digital data signals from the plurality of electrical input links comprised in the electrical input medium;
      receive the power signals from one or more electrical input links of the plurality of electrical input links comprised in the electrical input medium;
      provide the received digital data signals from the plurality of electrical input links to the at least one electrical communications output; and
      exclusively provide the received power signals from the one or more electrical input links to the lower set of electrical output links of the at least one electrical power output.

2. The power unit of claim 1 disposed in at least one remote antenna unit (RAU).

3. The power unit of claim 1, further comprising:
   a plurality of optical radio frequency (RF) communications inputs comprised of a plurality of optical RF communications input links each configured to convey optical RF communications signals; and
   a plurality of optical RF communications outputs optically coupled to the plurality of optical RF communications input links, the plurality of optical RF communications outputs configured to distribute the optical RF communications signals to at least one remote antenna unit (RAU).

4. The power unit of claim 3, further comprising an optical fiber coupled to either one of the plurality of optical RF communications inputs or one of the plurality of optical RF communications outputs.

5. The power unit of claim 1, wherein at least two of the plurality of electrical input links are coupled to respective power sources.

6. The power unit of claim 1, wherein the plurality of electrical output links comprises a plurality of lower-to-higher numbered electrical output links.

7. The power unit of claim 1 coupled to a digital data services controller configured to provide power to at least one of the plurality of electrical input links.

8. The power unit of claim 1, wherein the circuit comprises a diode bridge coupled to the plurality of electrical input links, the diode bridge configured to exclusively provide the received power signals from the one or more electrical input links to the lower set of electrical output links of the at least one electrical power output.

9. The power unit of claim 1, wherein the circuit is further configured to:
   receive second power signals from a power tap coupled to a power source; and
   provide the received second power signals to the upper set of electrical output links of the at least one electrical communications output.

10. The power unit of claim 1 disposed in at least one interconnect unit (ICU).

11. A method for distributing power in a distributed antenna system using a power unit, comprising:
    conveying digital data signals and power signals through a plurality of electrical input links comprised in an electrical input medium;
    distributing the digital data signals to at least one communications interface through at least one electrical communications output comprising a plurality of electrical output links comprising an upper set of electrical output links and a lower set of electrical output links;
    distributing the power signals to at least one power interface through at least one electrical power output comprising the lower set of electrical output links;
    receiving the digital data signals from the plurality of electrical input links comprised in the electrical input medium;
    receiving the power signals from one or more electrical input links of the plurality of electrical input links comprised in the electrical input medium;
    providing the received digital data signals from the plurality of electrical input links to the at least one electrical communications output; and
    exclusively providing the received power signals from the one or more electrical input links to the lower set of electrical output links of the at least one electrical power output.

12. The method of claim 11, further comprising disposing the power unit in at least one remote antenna unit (RAU).

13. The method of claim 11, further comprising:
    conveying optical radio frequency (RF) communications signals through a plurality of optical RF communications input links; and
    distributing the optical RF communications signals to at least one remote antenna unit (RAU).

14. The method of claim 13, wherein distributing the optical RF communications signals comprises distributing the optical RF communications signals over an optical fiber.

15. The method of claim 11, further comprising coupling two power sources to respective ones of the plurality of electrical input links.

16. The method of claim 11, further comprising coupling the at least one communications interface and the at least one power interface to an electrical output medium comprising a plurality of lower-to-higher numbered electrical output links.

17. The method of claim 11, further comprising providing power to at least one of the plurality of electrical input links from a digital data services controller.

18. The method of claim 11, comprising configuring a diode bridge in the power unit to exclusively provide the received power signals from the one or more electrical input links to the lower set of electrical output links of the at least one electrical power output.

19. The method of claim 11, further comprising:
    receiving second power signals from a power tap coupled to a power source; and
    providing the received second power signals to the upper set of electrical output links of the at least one electrical communications output.

20. A distributed antenna system, comprising:
at least one remote antenna unit (RAU), comprising:
- an optical input; and
- a data medium input comprising a data input and a power input;

at least one optical fiber configured to couple head-end equipment (HEE) to the at least one RAU through the optical input, the at least one optical fiber configured to carry radio frequency (RF) communications signals thereon between the HEE and the at least one RAU; and at least one power unit, comprising:
- an electrical input medium comprising a plurality of electrical input links each configured to convey digital data signals and power signals;
- an electrical output medium comprising a plurality of electrical output links comprising an upper set of electrical output links and a lower set of electrical output links, wherein:
  - the upper set of electrical output links and the lower set of electrical output links comprise at least one electrical communications output configured to distribute the digital data signals from the plurality of electrical input links to at least one communications interface;
  - the lower set of electrical output links comprise at least one electrical power output configured to distribute the power signals to at least one power interface; and
- a circuit configured to:
  - receive the digital data signals from the plurality of electrical input links comprised in the electrical input medium;
  - receive the power signals from one or more electrical input links of the plurality of electrical input links comprised in the electrical input medium;
  - provide the received digital data signals from the plurality of electrical input links to the at least one electrical communications output; and
  - exclusively provide the received power signals from the one or more electrical input links to the lower set of electrical output links of the at least one electrical power output.

21. The distributed antenna system of claim 20, wherein the circuit comprises a diode bridge.

22. The distributed antenna system of claim 20, further comprising:
- a plurality of optical RF communications inputs coupled to the at least one optical fiber and each configured to convey optical RF communications signals; and
- a plurality of optical RF communications outputs coupled to the at least one optical fiber configured to distribute the optical RF communications signals to the at least one RAU.

23. The distributed antenna system of claim 20, further comprising a digital data services controller configured to exclusively provide the received power signals from the one or more electrical input links to the lower set of electrical output links of the at least one electrical power output.

24. The distributed antenna system of claim 20, wherein the at least one power unit is provided in the at least one RAU.

25. The distributed antenna system of claim 20, further comprising at least one interconnect unit (ICU) provided between the HEE and the at least one RAU.

26. The distributed antenna system of claim 25, wherein the at least one power unit is provided in the at least one ICU.

* * * * *